US009990284B2

(12) United States Patent
Watanabe et al.

(10) Patent No.: US 9,990,284 B2
(45) Date of Patent: Jun. 5, 2018

(54) STORAGE CONTROL DEVICE

(71) Applicant: FUJITSU LIMITED, Kawasaki-shi, Kanagawa (JP)

(72) Inventors: Yoshiharu Watanabe, Yokohama (JP); Takanori Ishii, Nerima (JP); Tomoyuki Kanayama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 72 days.

(21) Appl. No.: 15/201,965

(22) Filed: Jul. 5, 2016

(65) Prior Publication Data
US 2017/0046258 A1 Feb. 16, 2017

(30) Foreign Application Priority Data
Aug. 11, 2015 (JP) ................................ 2015-158687

(51) Int. Cl.
*G06F 12/0802* (2016.01)
(52) U.S. Cl.
CPC .. *G06F 12/0802* (2013.01); *G06F 2212/1032* (2013.01); *G06F 2212/45* (2013.01)
(58) Field of Classification Search
CPC ......... G06F 12/0802; G06F 2212/1032; G06F 2212/45
See application file for complete search history.

(56) References Cited

U.S. PATENT DOCUMENTS

| 5,592,432 A * | 1/1997 | Vishlitzky ........... G06F 11/3419 365/230.03 |
| 5,592,628 A * | 1/1997 | Ueno ...................... G06F 9/544 709/200 |
| 6,708,233 B1 * | 3/2004 | Fuller ..................... G06F 13/28 710/22 |
| 2005/0027878 A1 * | 2/2005 | Sin ......................... H04L 1/1685 709/237 |
| 2012/0030402 A1 * | 2/2012 | Murakami ............ H04L 1/0045 710/313 |

FOREIGN PATENT DOCUMENTS

JP 6-164574 6/1994

* cited by examiner

*Primary Examiner* — Ramon A. Mercado
(74) *Attorney, Agent, or Firm* — Staas & Halsey LLP

(57) ABSTRACT

A storage control device includes a first processor, a second processor, and transfer units for transferring data from the first processor to the second processor. The first processor receives a write request for writing first data from a first device and sequentially transmits the first data, additional data, and pieces of dummy data. A number of the pieces is same as a number of the transfer units. The first processor notifies the first device of completion of the writing upon receiving an acknowledgement for a last transmitted piece of dummy data. Each transfer unit includes a third processor. The third processor receives the additional data from a preceding processor, and transmits an acknowledgement to the preceding processor upon storing the received additional data. The third processor receives one piece of dummy data from the preceding processor, and transmits an acknowledgement to the preceding processor upon storing the one piece.

6 Claims, 16 Drawing Sheets

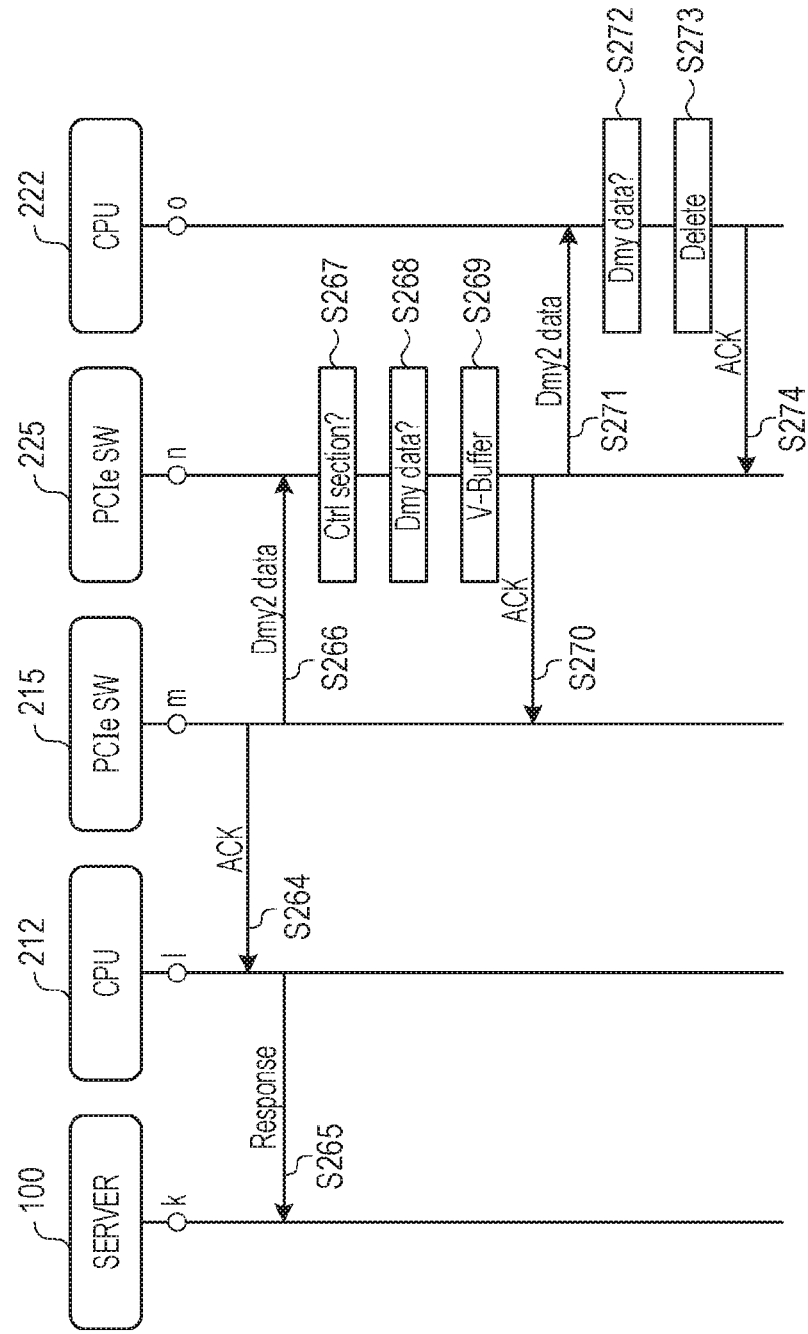

STORAGE CONTROL DEVICE

CROSS-REFERENCE TO RELATED APPLICATION

This application is based upon and claims the benefit of priority of the prior Japanese Patent Application No. 2015-158687, filed on Aug. 11, 2015, the entire contents of which are incorporated herein by reference.

FIELD

The embodiments discussed herein are related to a storage control device.

BACKGROUND

A storage system ensures reliability by multiplexing data. For example, a storage system enhances reliability by making redundant a storage device such as a hard disk drive (HDD) or a solid state drive (SSD) in which data is stored. There is another storage system that multiplexes a controller module (hereinafter referred to as a CM) configured to control reading and writing of data to and from a storage device and write the write data to the storage device after storing the write data in memories of multiple CMs. Since the write data is multiplexed in a preceding stage of the storage device, the reliability may be further enhanced.

In the storage system described above, in order to share the same write data among multiple CMs, the write data that one CM has received from a host computer is transmitted to the other CMs. The CMs are connected with each other through an input/output (I/O) serial interface such as Peripheral Component Interconnect Express (PCIe). Then, a device including a buffer memory, such as a PCIe switch for example, is provided between a central processing unit (CPU) included in the one CM and a CPU included in another CM.

As described above, multiplexing of CMs enhances the reliability. In addition, the reliability may be further enhanced if the arrival of data in inter-CM communications is guaranteed. For the guarantee of arrival in a data communication network, a technology has been proposed which achieves the guarantee of arrival of processed data between a transmission unit and a reception unit which are connected through a data communication network having a communication buffer. This transmission unit transmits dummy data that has a longer packet length than a communication buffer length, after the processed data, and thereby guarantees that the processed data preceding the dummy data has arrived at the reception unit.

A related technique is disclosed in, for example, Japanese Laid-open Patent Publication No. 06-164574.

The communication buffer in the technology described above does not return a response to a transmission source of stored data. On the other hand, among devices provided between CMs, there is a relay device, such as a PCIe switch, configured to return a response (hereinafter referred to as an Acknowledgement (ACK)) indicating that reception of data is completed, at the timing when the data is stored in a buffer memory.

Presence of such a relay device leads to the possibility that even when data has not arrived at a CPU that stores data in a memory of a CM on the receiving side, a CM on the transmitting side returns completion of reception of the data to a higher level device, in response to an ACK received from the relay device. Since there is a risk that abnormality occurs in the data at a subsequent stage of the relay device that has returned the ACK, achievement of the guarantee of arrival in inter-CM communications assuming such a relay device contributes to further enhancement of the reliability.

SUMMARY

According to an aspect of the present invention, provided is a storage control device including a first processor configured to transmit data, a second processor configured to receive the data, and transfer units configured to form a path through which the data is transferred from the first processor to the second processor. The first processor is configured to receive a write request for writing first data from a first device. The first processor is configured to sequentially transmit the first data, additional data, and pieces of dummy data. A number of the pieces is same as a number of the transfer units. The first processor is configured to notify the first device of completion of the writing upon receiving an acknowledgement for a last transmitted piece of dummy data. Each of the transfer units includes a storage unit provided with a first buffer area having a first size equal to or smaller than a data length of the additional data, and a third processor. The third processor is configured to receive the additional data from a preceding processor in the path. The third processor is configured to store the received additional data in the first buffer area. The third processor is configured to transmit, upon storing the received additional data, an acknowledgement for the received additional data to the preceding processor. The third processor is configured to receive one piece of dummy data from the preceding processor. The third processor is configured to store the one piece of dummy data in the first buffer area. The third processor is configured to transmit, upon storing the one piece of dummy data, an acknowledgement for the one piece of dummy data to the preceding processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 17 is a sixth sequence diagram illustrating a flow of processing related to inter-CM communications and a response to a server according to the variation example of the second embodiment.

DESCRIPTION OF EMBODIMENTS

Embodiments are described hereinafter with reference to the attached drawings. Note that any overlapping description may be omitted by assignment of identical symbols to elements having a substantially same function in the specification and drawings.

First Embodiment

Figure 1:
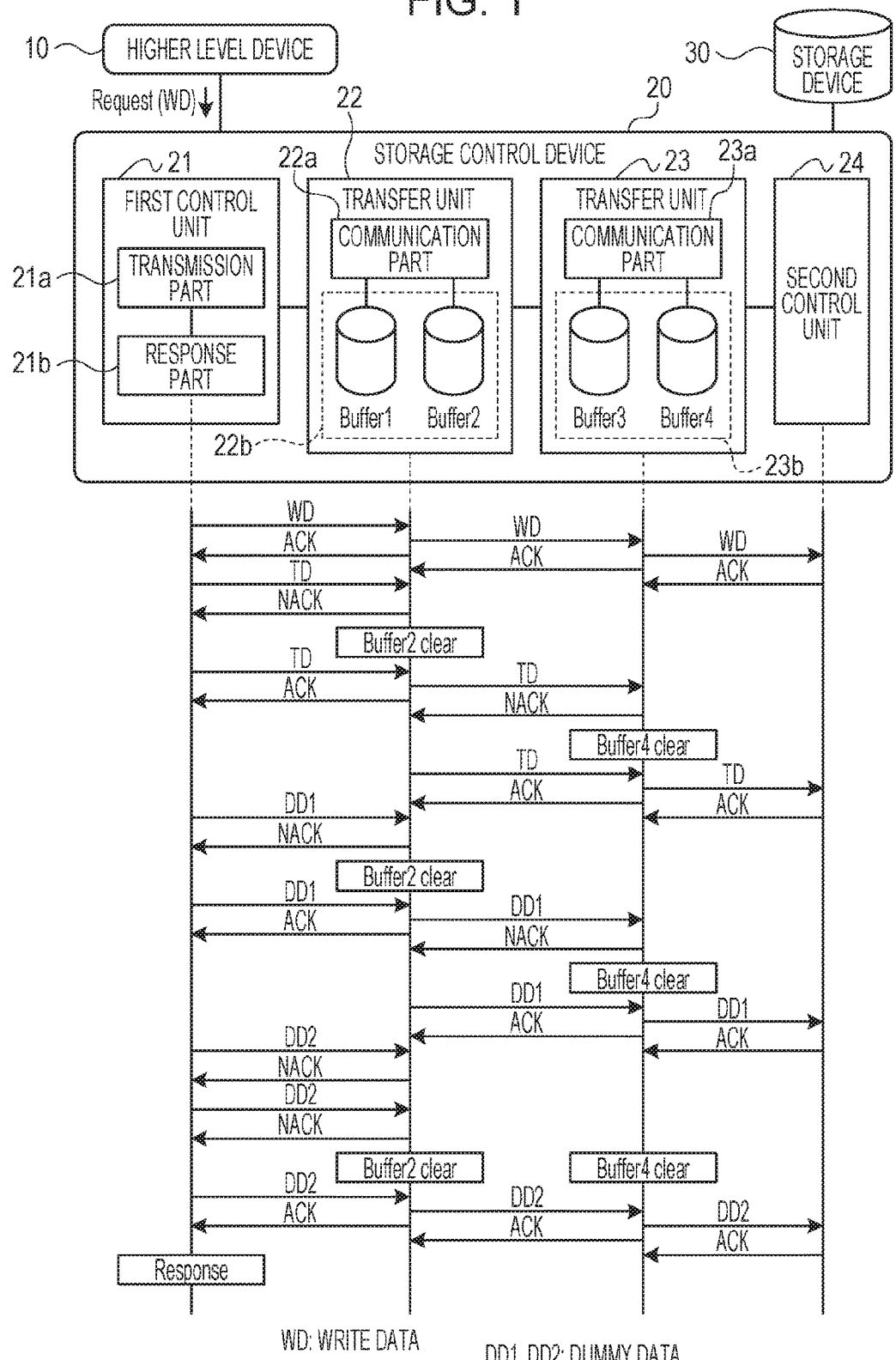
FIG. 1 is a diagram illustrating an example of a storage system according to a first embodiment.

A first embodiment is described with reference to FIG. 1. FIG. 1 is a diagram illustrating an example of a storage system according to the first embodiment.

In the first embodiment, there is provided a storage system that may achieve the guarantee of arrival of data even when a relay device having a buffer memory lies between CMs, for inter-CM communications within the storage control device configured to control reading and writing of data from and to a storage device.

As illustrated in FIG. 1, the storage system according to the first embodiment includes a higher level device 10, a storage control device 20, and a storage device 30.

The higher level device 10 is, for example, a server that operates as a host computer. The storage control device 20 controls reading or writing of data from or to the storage device 30, in response to a write request or a read request received from the higher level device 10. The storage device 30 is an HDD or an SSD, for example. The storage device 30 may be a redundant array of inexpensive disks (RAID) device that is made redundant by combining multiple HDDs or SSDs.

The storage control device 20 includes a first control unit 21, transfer units 22 and 23, and a second control unit 24. A CPU of a CM is an example of the first control unit 21 and the second control unit 24. A PCIe switch connecting CPUs which are main entities in inter-CM communications is an example of the transfer units 22 and 23.

In an example of FIG. 1, the transfer unit 22 is connected to a subsequent stage of the first control unit 21, the transfer unit 23 is connected to a subsequent stage of the transfer unit 22, and the second control unit 24 is connected to a subsequent stage of the transfer unit 23. More specifically, the transfer units 22 and 23 are located on a path on which data is transmitted from the first control unit 21 to the second control unit 24. Then, the transfer units 22 and 23 operate as relay devices configured to transfer data that is transmitted and received between the first control unit 21 and the second control unit 24.

The first control unit 21 includes a transmission part 21a and a response part 21b.

The transmission part 21a accepts a write request for writing write data WD from the higher level device 10 and sequentially transmits the write data WD, additional data TD indicating a write destination, and the same number of pieces of dummy data DD1 and DD2 as the number of the transfer units (transfer units 22 and 23) which lie on the path. The transmission part 21a may divide the write data WD to generate multiple divided pieces of data each having a preset data length (128 Bytes, for example), and sequentially transmit these multiple divided pieces of data.

The additional data TD includes, for example, information such as a write destination address or the like of the write data WD, which is used to update a management table that associates a physical address and a logical address of a cache memory (not illustrated) into which the write data WD is written. The Data length of the additional data TD is set to 128 Bytes or the like, for example. Each of the dummy data DD1 and DD2 has the same data length as the additional data TD and includes meaningless data such as Null data, for example.

The response part 21b notifies the higher level device 10 of completion of writing after receiving from the transfer unit 22 an acknowledgement (ACK) for the dummy data DD2 that has been last transmitted by the transmission part 21a. In the example of FIG. 1, since the write data WD, the additional data TD, the dummy data DD1, and the dummy data DD2 are transmitted in this order from the transmission part 21a to the transfer unit 22, the last transmitted data is the dummy data DD2.

The transfer unit 22 includes a storage part 22b. In the storage part 22b, Buffer1 and Buffer2 are provided. Buffer1 is a buffer area configured to store the write data WD. Buffer2 is a buffer area configured to store the additional data TD and the dummy data DD1 and DD2. Buffer2 is set to a size (128 Bytes, for example) which is equal to or smaller than the data length of the additional data TD and the dummy data DD1 and DD2.

The transfer unit 23 includes a storage part 23b. In the storage part 23b, Buffer3 and Buffer4 are provided. Buffer3 is a buffer area configured to store the write data WD. Buffer4 is a buffer area configured to store the additional data TD and the dummy data DD1 and DD2. Buffer4 is set to a size (128 Bytes, for example) which is equal to or smaller than the data length of the additional data TD and the dummy data DD1 and DD2.

The functions of the storage parts 22b and 23b may be implemented through the use of a volatile storage device such as a random access memory (RAM), or a non-volatile storage device such as an HDD or a flash memory or the like.

A communication part 22a included in the transfer unit 22 and a communication part 23a included in the transfer unit 23 are described hereinafter with reference to an example of sequence illustrated in the lower column of FIG. 1.

After receiving write data WD from the first control unit 21 and storing the write data WD in Buffer1, the communication part 22a transmits the write data WD stored in Buffer1 to the transfer unit 23 and transmits an ACK for the write data WD to the first control unit 21.

After receiving write data WD from the transfer unit 22 and storing the write data WD in Buffer3, the communication part 23a transmits the write data WD stored in Buffer3 to the second control unit 24 and transmits an ACK for the write data WD to the transfer unit 22. Upon receiving the write data WD, the second control unit 24 returns an ACK to the transfer unit 23.

Upon receiving the ACK from the communication part 22a, the first control unit 21 causes the transmission part 21a to transmit additional data TD to the transfer unit 22. When Buffer2 of the transfer unit 22 is not empty, the communication part 22a returns a NACK to the first control unit 21. Upon receiving the NACK, the first control unit 21 causes the transmission part 21a to transmit the additional data TD to the transfer unit 22 again.

Until Buffer2 becomes empty, transmission of the additional data TD from the first control unit 21 to the transfer unit 22 and reply of the NACK from the transfer unit 22 to the first control unit 21 are repeated.

When Buffer2 becomes empty, after receiving the additional data TD from the first control unit 21 and storing the received additional data TD in Buffer2, the communication part 22a transmits an ACK for the additional data TD to the first control unit 21 (transmission source of the additional data TD). The communication part 22a also transmits the additional data TD stored in Buffer2 to the transfer unit 23.

When Buffer4 of the transfer unit 23 is not empty, the communication part 23a returns a NACK to the transfer unit 22. Upon receiving the NACK, the transfer unit 22 causes the communication part 22a to transmit the additional data TD to the transfer unit 23 again.

Until Buffer4 becomes empty, transmission of the additional data TD from the transfer unit 22 to the transfer unit 23 and reply of the NACK from the transfer unit 23 to the transfer unit 22 are repeated.

When Buffer4 becomes empty, after receiving the additional data TD from the transfer unit 22 and storing the received additional data TD in Buffer4, the communication part 23a transmits an ACK for the additional data TD to the transfer unit 22 (transmission source of the additional data TD). The communication part 23a also transmits the additional data TD stored in Buffer4 to the second control unit 24. Upon receiving the additional data TD, the second control unit 24 returns an ACK to the transfer unit 23.

Upon receiving the ACK corresponding to the additional data TD from the communication part 22a, the first control unit 21 causes the transmission part 21a to transmit dummy data DD1 to the transfer unit 22. When Buffer2 of the transfer unit 22 is not empty, the communication part 22a returns a NACK to the first control unit 21. Upon receiving the NACK, the first control unit 21 causes the transmission part 21a to transmit the dummy data DD1 to the transfer unit 22 again.

Until Buffer2 becomes empty, transmission of the dummy data DD1 from the first control unit 21 to the transfer unit 22 and reply of the NACK from the transfer unit 22 to the first control unit 21 are repeated.

Upon receiving the ACK corresponding to the additional data TD from the transfer unit 23, the communication part 22a empties Buffer2 (Buffer2 clear).

Upon emptying Buffer2, the communication part 22a receives the dummy data DD1 from the first control unit 21, stores the received dummy data DD1 in Buffer2, and then transmits an ACK for the dummy data DD1 to the first control unit 21 (transmission source of the dummy data DD1). The communication part 22a also transmits the dummy data DD1 stored in Buffer2 to the transfer unit 23.

When Buffer4 of the transfer unit 23 is not empty, the communication part 23a returns a NACK to the transfer unit 22. Upon receiving the NACK, the transfer unit 22 causes the communication part 22a to transmit the dummy data DD1 to the transfer unit 23 again.

Until Buffer4 becomes empty, transmission of the dummy data DD1 from the transfer unit 22 to the transfer unit 23 and reply of the NACK from the transfer unit 23 to the transfer unit 22 are repeated.

Upon receiving the ACK corresponding to additional data TD from the second control unit 24, the communication part 23a empties Buffer4 (Buffer4 clear).

Upon emptying Buffer4, the communication part 23a receives the dummy data DD1 from the transfer unit 22, stores the received dummy data DD1 in Buffer4, and then transmits an ACK for the dummy data DD1 to the transfer unit 22 (transmission source of the dummy data DD1).

The communication part 23a also transmits the dummy data DD1 stored in Buffer4 to the second control unit 24. Upon receiving the dummy data DD1, the second control unit 24 returns an ACK to the transfer unit 23.

Upon receiving the ACK corresponding to the dummy data DD1 from the communication part 22a, the first control unit 21 causes the transmission part 21a to transmit dummy data DD2 to the transfer unit 22. When Buffer2 of the transfer unit 22 is not empty, the communication part 22a returns a NACK to the first control unit 21. Upon receiving the NACK, the first control unit 21 causes the transmission part 21a to transmit the dummy data DD2 to the transfer unit 22 again.

Until Buffer2 becomes empty, transmission of the dummy data DD2 from the first control unit 21 to the transfer unit 22 and reply of the NACK from the transfer unit 22 to the first control unit 21 are repeated.

Upon receiving the ACK corresponding to the dummy data DD1 from the transfer unit 23, the communication part 22a empties Buffer2 (Buffer2 clear). Upon emptying Buffer2, the communication part 22a receives dummy data DD2 from the first control unit 21, stores the received dummy data DD2 in Buffer2, and then transmits an ACK for the dummy data DD2 to the first control unit 21 (transmission source of the dummy data DD2). The communication part 22a also transmits the dummy data DD2 stored in Buffer2 to the transfer unit 23.

Upon receiving the ACK corresponding to the dummy data DD1 from the second control unit 24, the communication part 23a empties Buffer4 (Buffer4 clear). Upon emptying Buffer4, the communication part 23a receives the dummy data DD2 from the transfer unit 22, stores the received dummy data DD2 in Buffer4, and then transmits an ACK for the dummy data DD2 to the transfer unit 22 (transmission source of the dummy data DD2). The communication part 23a also transmits the dummy data DD2 stored in Buffer4 to the second control unit 24. Upon receiving the dummy data DD2, the second control unit 24 returns an ACK to the transfer unit 23.

Upon receiving the ACK corresponding to the dummy data DD2 from the transfer unit 22, the response part 21*b* notifies the higher level device 10 of completion of writing of the write data WD. As described above, through limitation of size of Buffer2 and Buffer4 to be equal to or smaller than the data length of the additional data TD, the additional data TD and dummy data DD1 and DD2 are transferred sequentially in a manner of being pushed out from a relay device. Thus, when the first control unit 21 receives an ACK for the dummy data DD2, the additional data TD has arrived at the second control unit 24, which thus guarantees that the additional data TD and the write data WD have arrived.

While Buffer1 and Buffer2 are illustrated as being separate in the example of FIG. 1, the guarantee of arrival mentioned above may be achieved utilizing one variable-sized buffer area. For example, a method may be employed that changes the size of the buffer area to a size suitable for storing the write data WD before transfer of the write data WD and changes the size of the buffer area to be equal to or smaller than the data length of the additional data TD before transfer of the additional data TD. This also applies to Buffer3 and Buffer 4.

When this method is employed, control to change the size of the buffer area is added and provision of separate buffer areas to store the additional data TD and the dummy data DD1 and DD2 may be saved. Such a variation also belongs to a technical scope of the first embodiment.

The first embodiment is described above.

Second Embodiment

A second embodiment is described hereinafter. The second embodiment provides a storage system that may guarantee arrival of data even when a relay device having a communication buffer lies between CMs, in inter-CM communications in the storage system.

Figure 2:
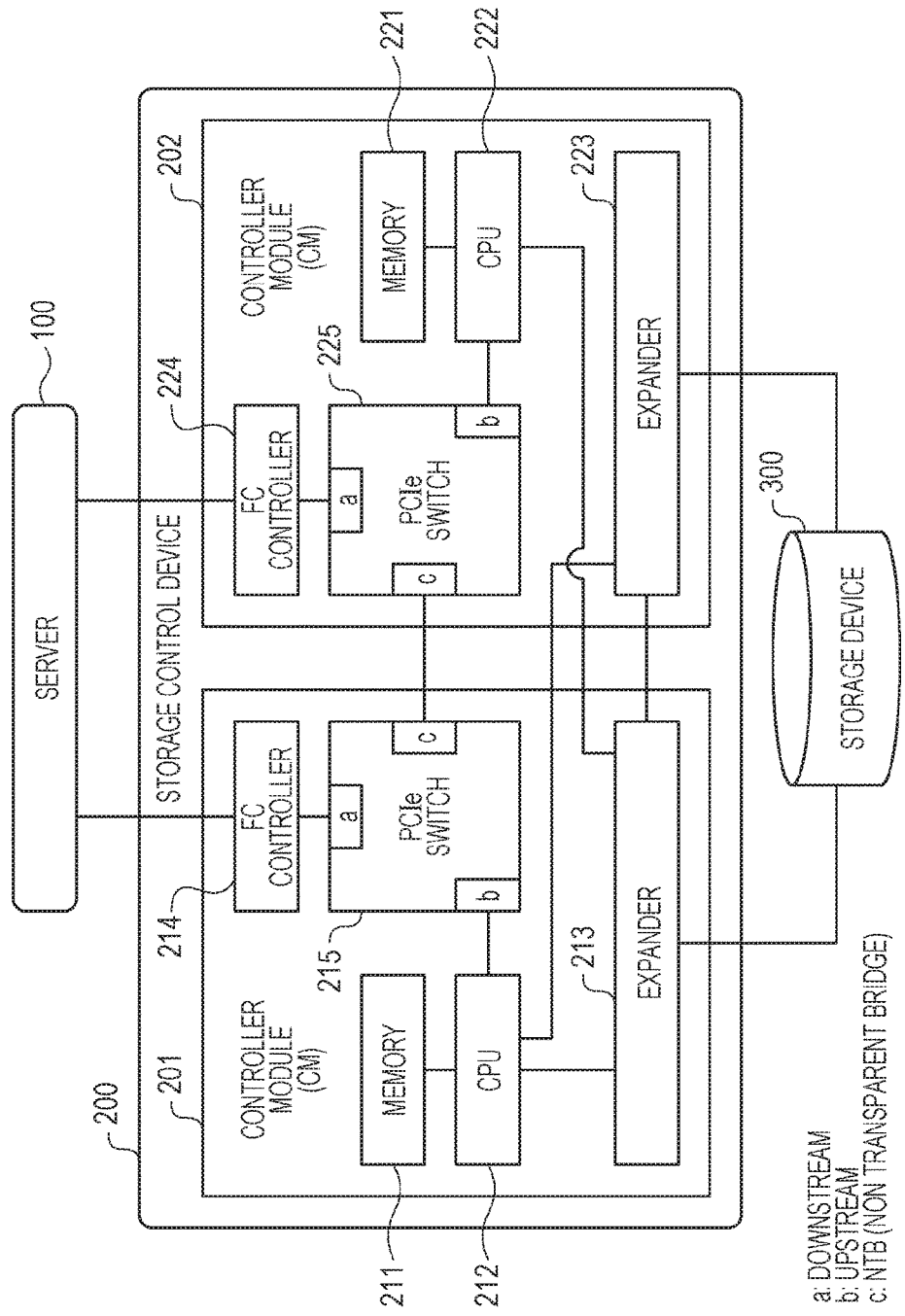
FIG. 2 is a diagram illustrating an example of a storage system according to a second embodiment.

The storage system according to the second embodiment is described with reference to FIG. 2. FIG. 2 is a diagram illustrating an example of the storage system according to the second embodiment.

As illustrated in FIG. 2, the storage system according to the second embodiment includes a server 100, a storage control device 200, and a storage device 300.

The server 100 is an information processing apparatus configured to function as a host computer. The storage control device 200 controls reading and writing of data from and to the storage device 300, in response to a write request or a read request received from the server 100. The storage device 300 is an HDD, an SSD, or the like. The storage device 300 may be a RAID device that is made redundant by combining multiple HDDs or SSDs.

The storage control device 200 includes CMs 201 and 202. The CM 201 includes a memory 211, a CPU 212, an expander 213, a fibre channel (FC) controller 214, and a PCIe switch 215. Similarly, the CM 202 includes a memory 221, a CPU 222, an expander 223, an FC controller 224, and a PCIe switch 225.

In the storage system illustrated in FIG. 2, while the CMs 201 and 202 are located in a housing of the same storage control device 200, the CMs 201 and 202 may be mounted in different storage control devices and connected via a channel between the storage control devices. Here, for convenience of description, an example in which the CMs 201 and 202 are included in a housing of the storage control device 200 is described.

The memories 211 and 221 are RAMs, HDDs, flash memories, or the like. The expander 213 is an expansion device configured to connect the CPU 212, which is a host controller of a serial attached small computer system interface (SAS), and the storage device 300 which is an end device. Similarly, the expander 223 is an expansion device configured to connect the CPU 222, which is a host controller of an SAS, and the storage device 300, which is an end device. The expanders 213 and 223 are mutually connected. The expander 213 is also connected to the CPU 222 and the expander 223 is also connected to the CPU 212.

The FC controllers 214 and 224 are communication interfaces configured to be connected with the server 100 through FC. The PCIe switches 215 and 225 are switches configured to PCIe-connect a device connected to the upstream side with a device connected to the downstream side. The PCIe switches 215 and 225 also have a non-transparent bridge (NTB) function, enabling communications of a group of devices connected to the PCIe switch 215 with a group of devices connected to the PCIe switch 225. The PCIe switches 215 and 225 have a processor such as a CPU.

Here, inter-CM communications are described with reference to FIGS. 3 to 6.

Figure 3:
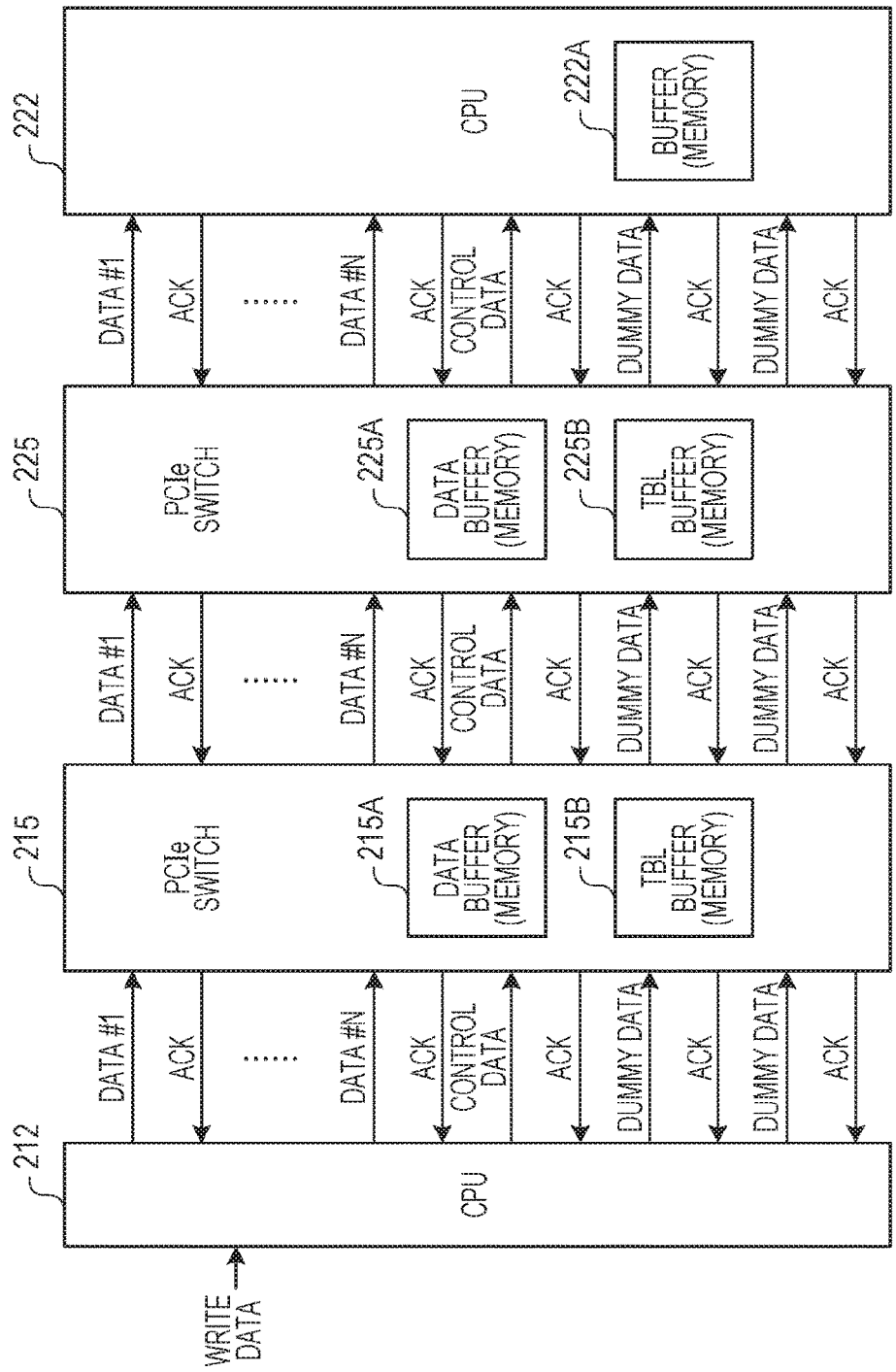
FIG. 3 is a diagram illustrating inter-CM communications according to the second embodiment.

FIG. 3 is a diagram illustrating inter-CM communications according to the second embodiment.

As illustrated in FIG. 3, the PCIe switch 215 includes a buffer memory to be used as a communication buffer, and a data buffer 215A and a TBL buffer 215B are set as buffer areas. Similarly, the PCIe switch 225 includes a buffer memory to be used as a communication buffer, and a data buffer 225A and a TBL buffer 225B are set as buffer areas.

The data buffers 215A and 225A are buffer areas configured to store target data of write processing or read processing. The TBL buffers 215B and 225B are buffer areas configured to store dummy data and control data to be appended to target data. The TBL buffers 215B and 225B are set to have a size which is equal to or smaller than the data length of the control data. The CPU 222 also includes a buffer 222A to be used as a communication buffer.

An example of FIG. 3 illustrates the condition of inter-CM communications in which the CPU 212 transmits, to the CPU 222, write data that is received together with a write request from the server 100. In this case, the CPU 212 divides the write data to generate data #1, . . . , data #N of unit size (128 Bytes, for example). The CPU 212 also generates control data. The control data includes information, such as a write destination address or the like, which is used to update a management table that associates a physical address and a logical address of the memory 221 into which the CPU 222 caches the write data.

In addition, the CPU 212 generates the same number of pieces of dummy data as the number of relay devices (PCIe switches 215 and 225 in this example) which lie between the CPUs 212 and 212. At this time, the CPU 212 focuses on the number of relay devices which are located on a communication path between the CPUs 212 and 222 and return an acknowledgement (ACK) at the timing when the data is stored in the communication buffer. In the example of FIG. 3, two pieces of dummy data are generated. For example, dummy data has the same data length as control data and includes meaningless data such as Null data.

Figure 4:
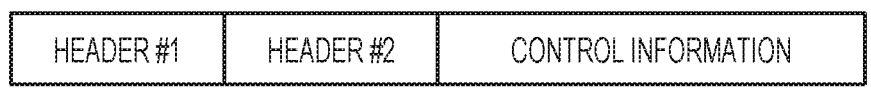
FIG. 4 is a diagram illustrating an example of a packet structure of control data according to the second embodiment.

The control data has a packet structure as illustrated in FIG. 4. FIG. 4 is a diagram illustrating an example of a packet structure of control data according to the second embodiment. As illustrated in FIG. 4, a packet of control data has a structure having two headers #1 and #2 after which control information including information used to update a management table or the like is appended.

Figure 5:
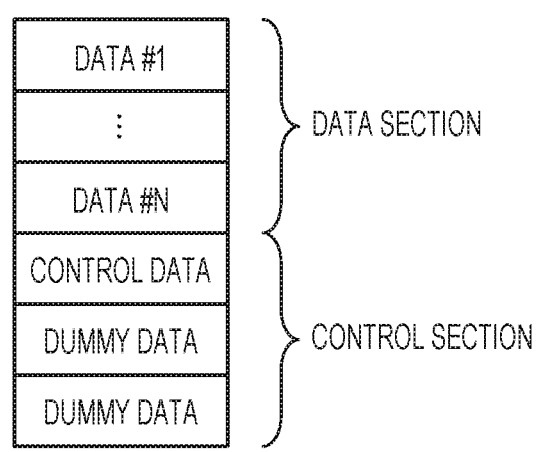
FIG. 5 is a diagram illustrating a data section and a control section.

The header #1 includes tag information to identify data in a control section (see FIG. 5). Here, as illustrated in FIG. 5, a section including data #1, . . . , data #N, which are generated from write data, is referred to as a data section, and a section including control data and dummy data is referred to as the control section. FIG. 5 is a diagram illustrating the data section and the control section. The header #2 includes tag information to identify control data.

Figure 6:
FIG. 6 is a diagram illustrating an example of a packet structure of dummy data according to the second embodiment.

As illustrated in FIG. 6, a packet of dummy data also has headers #1 and #2. FIG. 6 is a diagram illustrating an example of a packet structure of dummy data according to the second embodiment. The header #1 of the dummy data includes the same tag information as the header #1 of the control data. On the other hand, the header #2 of the dummy data includes tag information to identify dummy data. Then, Null data or the like is appended after the headers #1 and #2.

As illustrated in FIG. 3, the CPU 212 sequentially transmits data #1, . . . , data #N, control data, and two pieces of dummy data, as packets having the packet structure as described above, to the PCIe switch 215.

Upon receiving the data #1, . . . , the data #N, the PCIe switch 215 stores each data in the data buffer 215A and then returns an ACK to the CPU 212. In addition, the PCIe switch 215 transmits the data #1, . . . , the data #N stored in the data buffer 215A to the PCIe switch 225.

Upon receiving the data #1, . . . , the data #N, the PCIe switch 225 stores each data in the data buffer 225A and then returns an ACK to the PCIe switch 215. In addition, the PCIe switch 225 transmits the data #1, . . . , the data #N stored in the data buffer 225A to the CPU 222. Upon receiving the data #1, . . . , the data #N, the CPU 222 stores each data in buffer 222A and then returns an ACK to the PCIe switch 225.

Upon receiving control data, the PCIe switch 215 stores the control data in the TBL buffer 215B and then returns an ACK to the CPU 212. The PCIe switch 215 also transmits the control data stored in the TBL buffer 215B to the PCIe switch 225. If the size of the TBL buffer 215B is smaller than the data length of the control data, the control data is divided and transmitted. Here, for convenience of description, it is assumed that the size of the TBL buffers 215B and 225B, the data length of the control data, and the data length of the dummy data are same.

Upon receiving the control data, the PCIe switch 225 stores the control data in the TBL buffer 225B and then returns an ACK to the PCIe switch 215. The PCIe switch 225 also transmits the control data stored in the TBL buffer 225B to the CPU 222. Upon receiving the control data, the CPU 222 stores the control data in buffer 222A and then returns an ACK to the PCIe switch 225.

Upon receiving the ACK from the PCIe switch 225, the PCIe switch 215 empties the TBL buffer 215B. Then, the PCIe switch 215 receives dummy data from the CPU 212. The PCIe switch 215 stores the received dummy data in the TBL buffer 215B and then returns an ACK to the CPU 212.

Upon receiving the ACK from the CPU 222, the PCIe switch 225 empties the TBL buffer 225B. Then, the PCIe switch 225 receives the dummy data from the PCIe switch 215. The PCIe switch 225 stores the received dummy data in the TBL buffer 225B and then returns an ACK to the PCIe switch 215.

After receiving an ACK for all of the data #1, . . . , the data #N, the control data, and the two pieces of dummy data, the CPU 212 returns to the server 100 a response indicating completion of writing. The CPU 222 discards the received dummy data. By referring to the headers #1 and #2 described above, the CPU 222 may determine whether the received data is the data #1, . . . , the data #N, or the control data, or the dummy data. The CPU 222 may refer to the header #1 to distinguish the control section from the data section and determine that the data following the control data is the dummy data.

As described above, by setting the TBL buffers 215B and 225B to have an appropriate size and sequentially transmitting the two pieces of dummy data following the control data, each data is transferred in a manner of being pushed from each buffer. Thus, arrival of data preceding the control data is guaranteed. More specifically, when the CPU 212 receives an ACK for the last dummy data, the control data arrives at the CPU 222, which thus guarantees that data preceding the control data has arrived.

For example, upon receiving data from the server 100, the CPU 212 writes the received data to the memory 211. In order to achieve multiplexing by multiple CMs, the CPU 212 utilizes direct memory access (DMA) to start copying the data to the memory 221. In the data transmission through DMA, when an ACK is returned from a device (PCIe switch 215) on a next stage which is on a communication path, it is determined that the CPU 212 completes the DMA transfer.

If it is assumed that the PCIe switch 215 utilizes, as a communication buffer, a buffer area which is larger than the data length of the data to be DMA transferred, it may be determined that the DMA transfer is completed before the data arrives at the CPU 222 located on the last stage. Thus, even if data abnormality is detected in the CPU 222 and inter-CM communications are linked down, the CPU 212 may transmit a completion notice to the server 100.

However, as described so far, the risk of erroneously transmitting a completion notice may be avoided by utilizing the TBL buffers 215B and 225B to transmit the same number of pieces of dummy data as the number of relay devices. Although a method in which the CPU 212 re-acquires data, which has arrived at the CPU 222 and is written to the memory 221, through DMA transfer and ensures completion of arrival is also possible, an extra transfer process becomes a factor of performance deterioration such as a delayed response or increased load. However, with the method as described so far, such risk of performance deterioration does not arise.

So far inter-CM communications according to the second embodiment are described.

Next, a sequence of write processing in the storage system according to the second embodiment is further described with reference to FIGS. 7 to 10.

Figure 7:
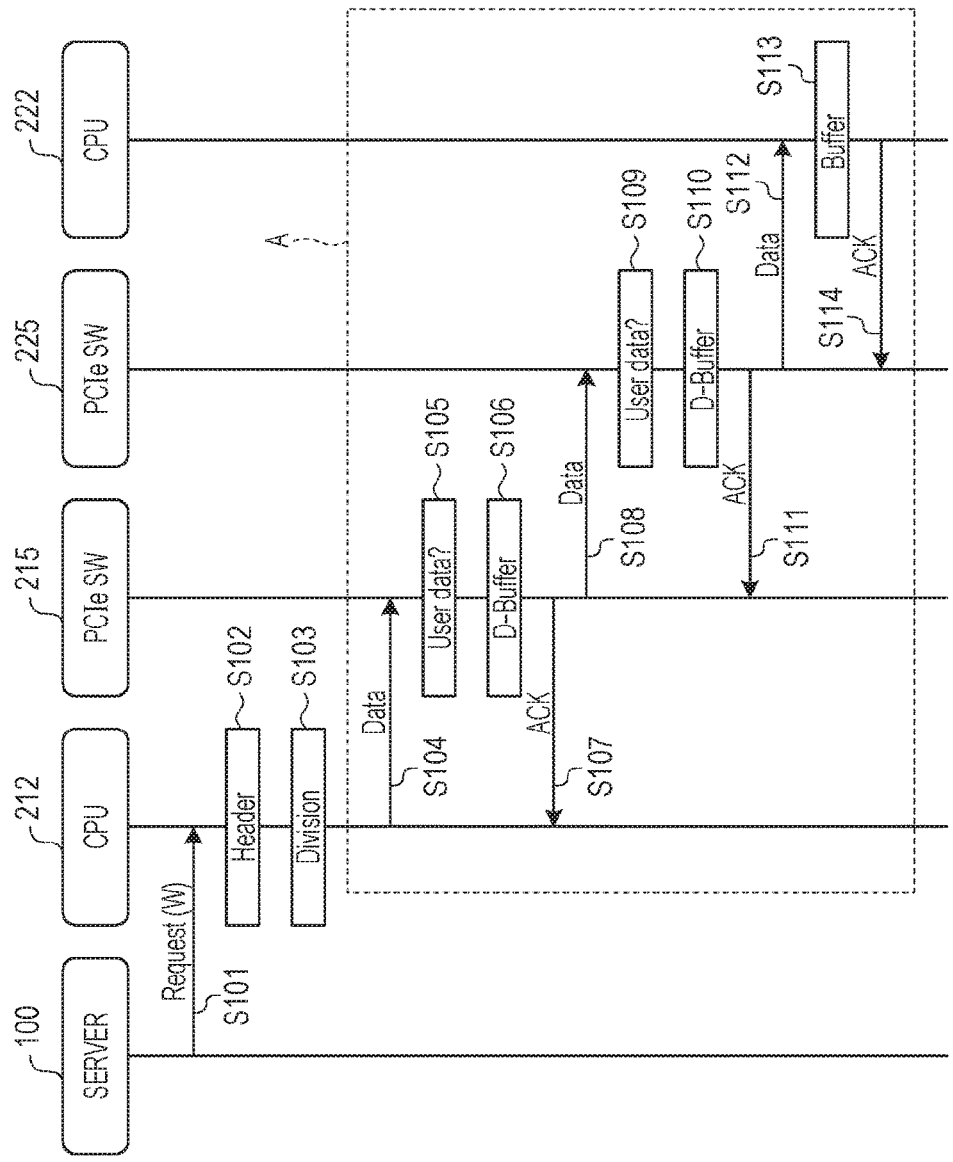
FIG. 7 is a first sequence diagram illustrating a flow of processing related to inter-CM communications and a response to a server according to the second embodiment.

First, reference is made to FIG. 7. FIG. 7 is a first sequence diagram illustrating a flow of processing related to inter-CM communications and a response to a server according to the second embodiment.

(S101) The server 100 transmits a write request ("Request (W)" in the drawings) of data to the CM 201. The write request transmitted from the server 100 is received by the FC controller 214 and inputted to the CPU 212 by way of the PCIe switch 215. Upon receiving the write request, the CPU 212 starts processing of inter-CM communications to transmit the write target data (hereinafter referred to as user data) to the CPU 222 of the CM 202.

(S102) The CPU 212 generates a header to be appended to the user data. For example, the CPU 212 generates a header #1 including tag information that distinguishes between the data section and the control section (see FIG. 5).

(S103) The CPU 212 divides the user data to generate divided data having a preset unit size (128 Bytes, for example). Then, the CPU 212 appends the header #1 generated in S102 to each piece of the divided data. In the following description, the divided data may be simply referred to as user data.

(S104) The CPU 212 sequentially transmits the divided data ("Data" in the drawings) generated in S103 to the PCIe switch 215.

(S105) The PCIe switch 215 determines whether or not the data received from the CPU 212 is user data. For example, the PCIe switch 215 refers to the header #1 appended to the received data and determines that the received data is the user data when the header #1 includes tag information indicating the data section. Since the data transmitted from the CPU 212 in S104 is the divided data, the PCIe switch 215 determines that the received data is the user data.

(S106) The PCIe switch 215 stores the divided data received from the CPU 212 in the data buffer 215A ("D-Buffer" in the drawings). The data buffer 215A may be set to a size (25 Kbytes, for example) larger than the unit size which is the data length of the divided data.

(S107) The PCIe switch 215 returns to the CPU 212 an acknowledgement ("ACK" in the drawings) indicating that reception of the divided data is completed. In response to this ACK, the CPU 212 transmits next divided data to the PCIe switch 215. More specifically, S104 to S114 (range of a dotted rectangular area A in FIG. 7) is started for the next divided data.

(S108) The PCIe switch 215 transmits the divided data stored in the data buffer 215A to the PCIe switch 225.

(S109) The PCIe switch 225 determines whether or not the data received from the PCIe switch 215 is user data. For example, the PCIe switch 225 refers to the header #1 appended to the received data and determines that the received data is the user data when the header #1 includes tag information indicating the data section. Since the data transmitted from the PCIe switch 215 in S108 is the divided data, the PCIe switch 225 determines that the received data is the user data.

(S110) The PCIe switch 225 stores the divided data received from the PCIe switch 215 in the data buffer 225A ("D-Buffer" in the drawings). The data buffer 225A may be set to a size (25 Kbytes, for example) larger than the unit size which is the data length of the divided data.

(S111) The PCIe switch 225 returns to the PCIe switch 215 an acknowledgement ("ACK" in the drawings) indicating that reception of the divided data is completed. In response to this ACK, the PCIe switch 215 transmits to the PCIe switch 225 next divided data stored in the data buffer 215A.

(S112) The PCIe switch 225 transmits the divided data stored in the data buffer 225A to the CPU 222.

(S113) The CPU 222 stores the divided data received from the PCIe switch 225 in buffer 222A.

(S114) The CPU 222 returns to the PCIe switch 225 an acknowledgement ("ACK" in the drawings) indicating that reception of the divided data is completed. In response to this ACK, the PCIe switch 225 transmits to the CPU 222 next divided data stored in the data buffer 225A. Note that processing in the range of the dotted rectangular area A is executed on all pieces of the divided data.

After transmitting all pieces of the divided data to the PCIe switch 215, the CPU 212 starts to transmit control data and dummy data.

Figure 8:
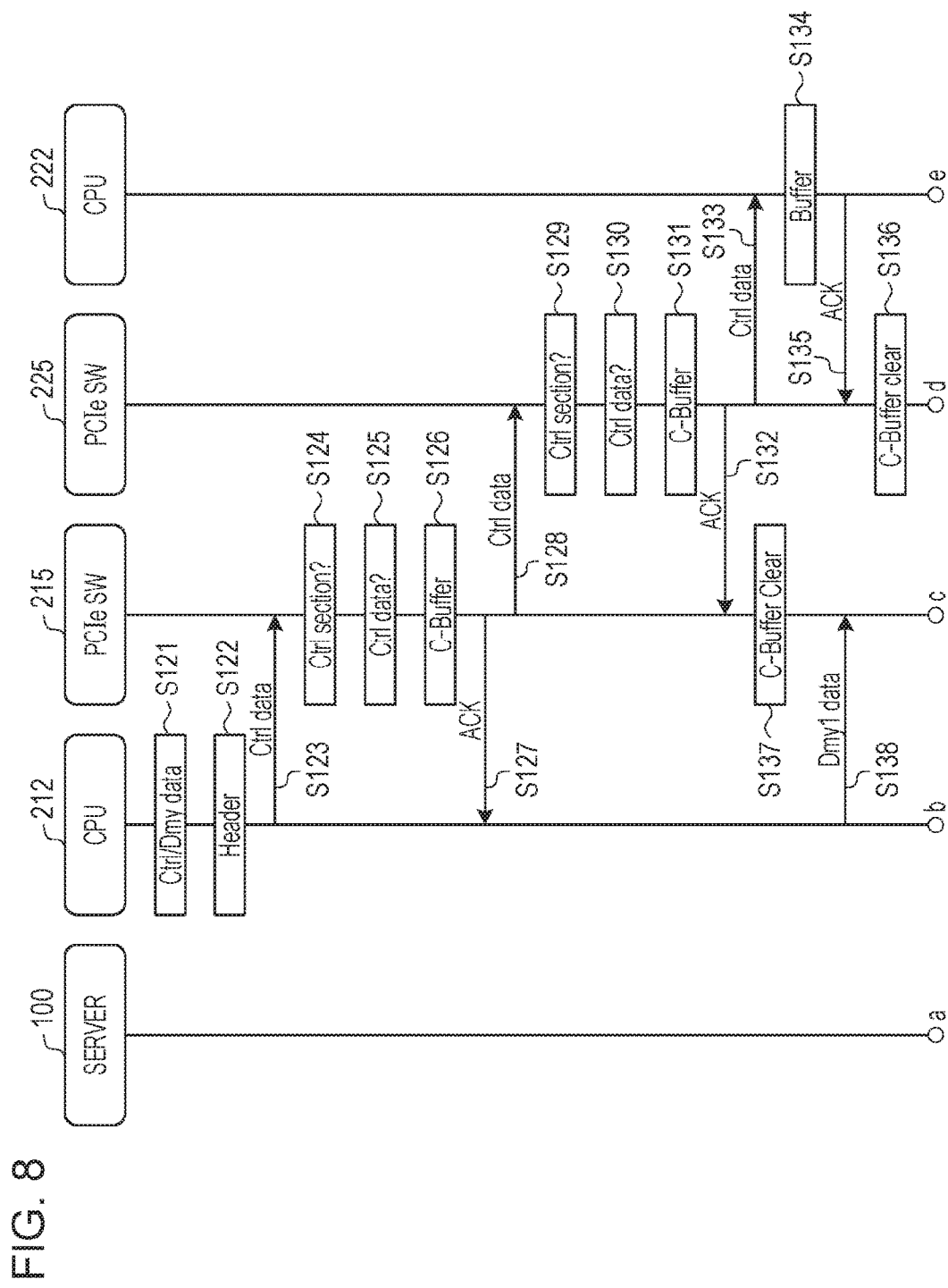
FIG. 8 is a second sequence diagram illustrating a flow of processing related to inter-CM communications and a response to a server according to the second embodiment.
Figure 9:
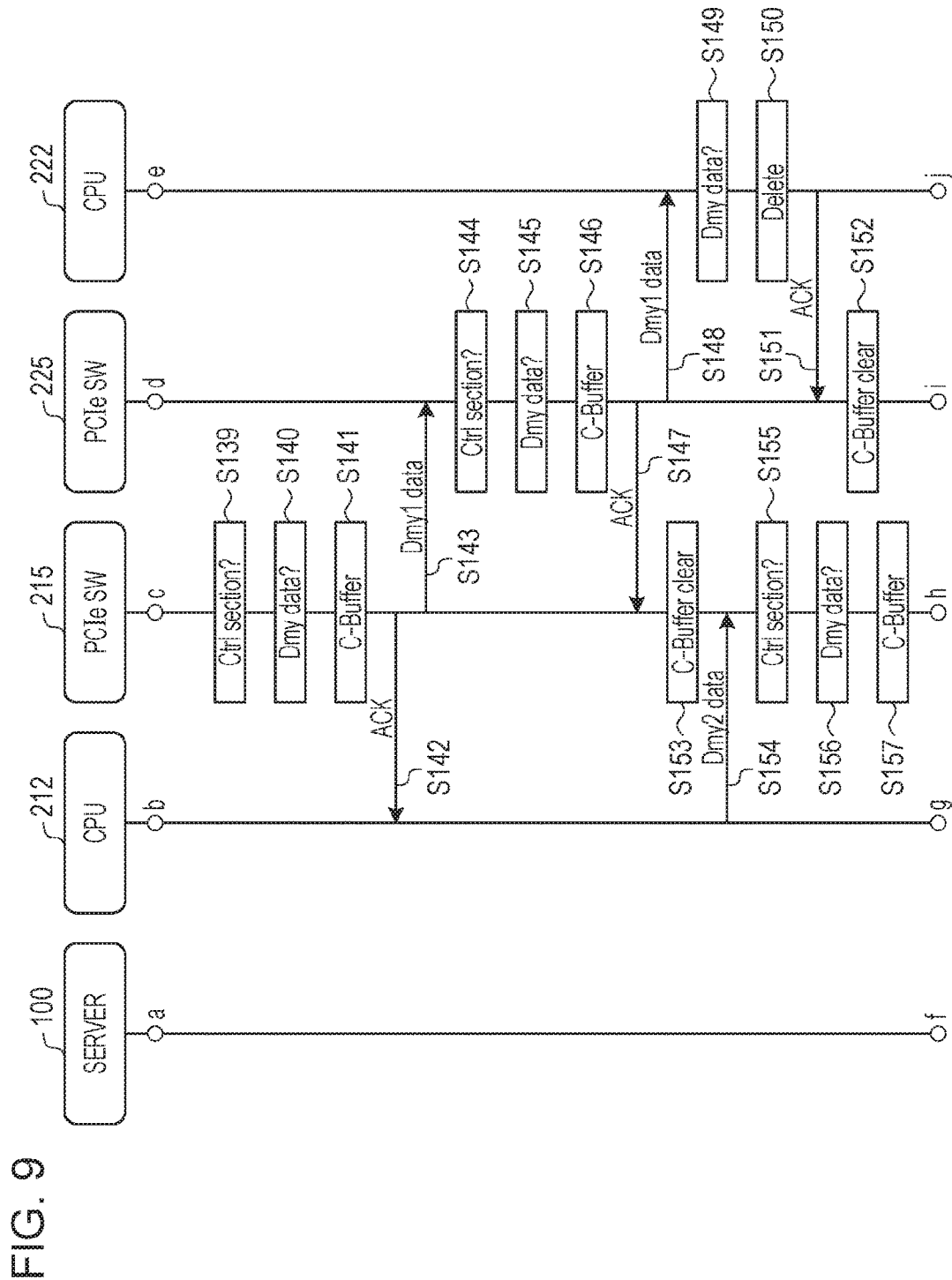
FIG. 9 is a third sequence diagram illustrating a flow of processing related to inter-CM communications and a response to a server according to the second embodiment.
Figure 10:
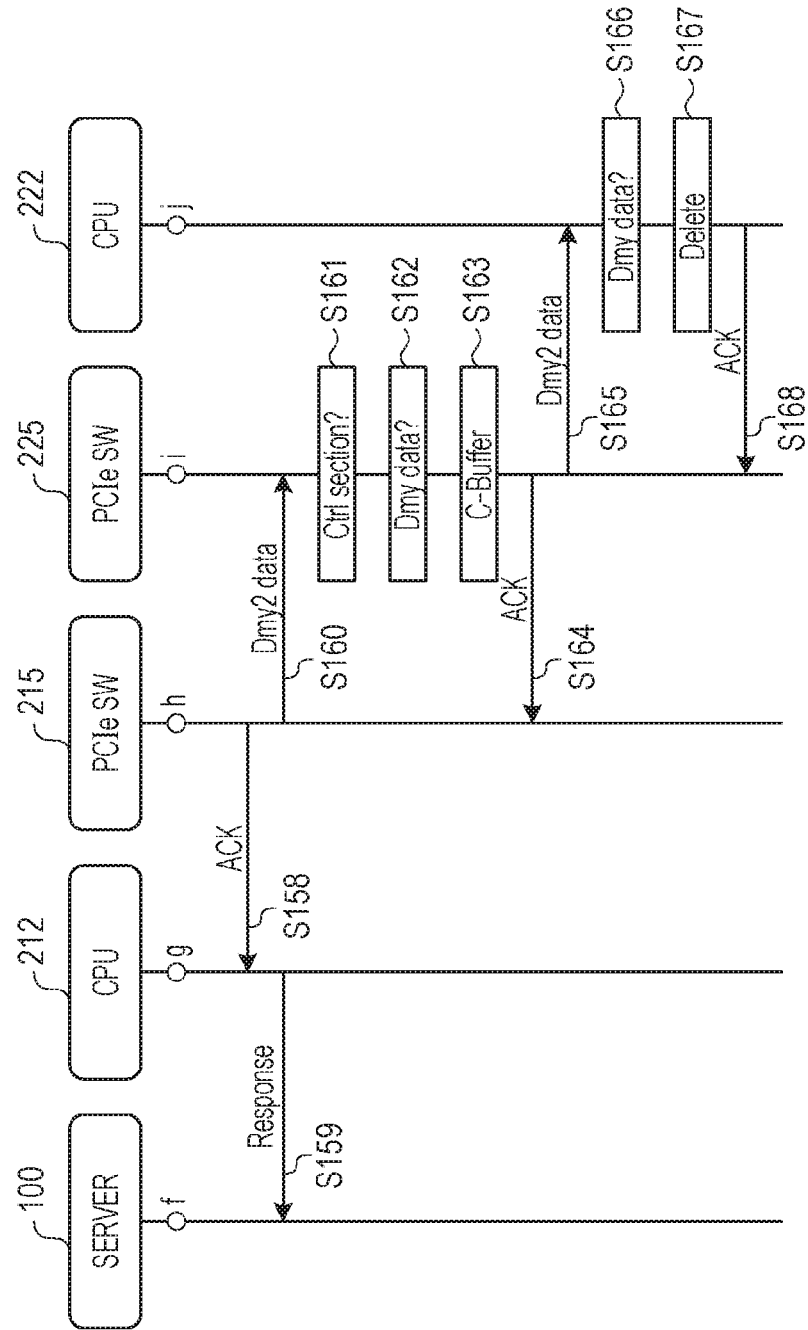
FIG. 10 is a fourth sequence diagram illustrating a flow of processing related to inter-CM communications and a response to a server according to the second embodiment.

In the following, reference is sequentially made to FIGS. 8 to 10. FIG. 8 is a second sequence diagram illustrating a flow of processing related to inter-CM communications and a response to the server according to the second embodiment. FIG. 9 is a third sequence diagram illustrating a flow of processing related to inter-CM communications and a response to the server according to the second embodiment. FIG. 10 is a fourth sequence diagram illustrating a flow of processing related to the inter-CM communications and a response to the server according to the second embodiment. Note that "a" to "e" assigned to the lines in FIG. 8 are connected to "a" to "e" assigned to the lines in FIG. 9, and "f" to "j" assigned to the lines in FIG. 9 are connected to "f" to "j" assigned to the lines in FIG. 10.

(S121) The CPU 212 generates control data ("Ctrl data" in the drawings) including information indicating a write destination of the user data and the same number of pieces of dummy data ("Dmy data" in the drawings) as the number of relay devices which lie between the CPUs 212 and 222.

In this example, since the PCIe switches 215 and 225 lie as the relay devices which lie between the CPUs 212 and 222, two pieces of dummy data ("Dmy1 data" and "Dmy2 data" in the drawings) are generated. The dummy data is, for example, Null data and has the same data length (128 Bytes, for example) as the control data.

(S122) The CPU 212 generates a header to be appended to the control data and the dummy data. For example, the CPU 212 generates a header #1 including tag information that distinguishes between the data section and the control section (see FIG. 5). The CPU 212 also generates a header #2 including tag information that distinguishes between the control data and the dummy data (see FIGS. 4 and 6). Then, the CPU 212 appends the headers #1 and #2 to the control data and the dummy data.

(S123) The CPU 212 transmits the control data to the PCIe switch 215.

(S124) The PCIe switch 215 determines whether or not the data received from the CPU 212 is data in the control section ("Ctrl section" in the drawings). For example, the PCIe switch 215 refers to the header #1 appended to the data received from the CPU 212 and determines that the received data is data in the control section when the header #1 includes tag information indicating the control section. Since the data transmitted from the CPU 212 in S123 is the control data, the PCIe switch 215 determines that the received data is data in the control section.

(S125) The PCIe switch 215 determines whether or not the data received from the CPU 212 is the control data ("Ctrl data" in the drawings). For example, the PCIe switch 215 refers to the header #2 appended to the data received from the CPU 212 and determines that the received data is the control data when the header #2 includes tag information indicating the control data. Since the data transmitted from the CPU 212 in S123 is the control data, the PCIe switch 215 determines that the received data is the control data.

(S126) The PCIe switch 215 stores the control data received from the CPU 212 in the TBL buffer 215B ("C-Buffer" in the drawings). The TBL buffer 215B has a size (128 Bytes, for example) which is equal to or smaller than the data length of the control data.

(S127) The PCIe switch 215 returns to the CPU 212 an acknowledgement ("ACK" in the drawings) indicating that reception of the control data is completed.

(S128) The PCIe switch 215 transmits the control data stored in the TBL buffer 215B to the PCIe switch 225.

(S129) The PCIe switch 225 determines whether or not the data received from the PCIe switch 215 is data in the control section ("Ctrl section" in the drawings). For example, the PCIe switch 225 refers to the header #1 appended to the data received from the PCIe switch 215 and determines that the received data is data in the control section when the header #1 includes tag information indicating the control section. Since the data transmitted from the PCIe switch 215 in S128 is the control data, the PCIe switch 225 determines that the received data is data in the control section.

(S130) The PCIe switch 225 determines whether or not the data received from the PCIe switch 215 is the control data ("Ctrl data" in the drawings). For example, the PCIe switch 225 refers to the header #2 appended to the data received from the PCIe switch 215 and determines that the received data is the control data when the header #2 includes tag information indicating the control data. Since the data transmitted from the PCIe switch 215 in S128 is the control data, the PCIe switch 225 determines that the received data is the control data.

(S131) The PCIe switch 225 stores the control data received from the PCIe switch 215 in the TBL buffer 225B ("C-Buffer" in the drawings). The TBL buffer 225B has a size (128 Bytes, for example) which is equal to or smaller than the data length of the control data.

(S132) The PCIe switch 225 returns to the PCIe switch 215 an acknowledgement ("ACK" in the drawings) indicating that reception of the control data is completed.

(S133) The PCIe switch 225 transmits the control data stored in the TBL buffer 225B to the CPU 222.

(S134) The CPU 222 refers to the headers #1 and #2 of the data received from the PCIe switch 225, confirms that data is the control data, and stores that control data in the buffer 222A.

(S135) The CPU 222 returns to the PCIe switch 225 an acknowledgement ("ACK" in the drawings) indicating that reception of the control data is completed.

(S136) Upon receiving the ACK from the CPU 222, the PCIe switch 225 empties the TBL buffer 225B ("C-Buffer clear" in the drawings).

(S137) Upon receiving the ACK transmitted from the PCIe switch 225 in S132, the PCIe switch 215 empties the TBL buffer 215B ("C-Buffer clear" in the drawings).

(S138) The PCIe switch 215 receives dummy data ("Dmy1 data" in the drawings) from the CPU 212.

(S139) The PCIe switch 215 determines whether or not the data received from the CPU 212 is data in the control section ("Ctrl section" in the drawings). For example, the PCIe switch 215 refers to the header #1 appended to the data received from the CPU 212 and determines that the received data is data in the control section when the header #1 includes tag information indicating the control section. Since the data transmitted from the CPU 212 in S138 is the dummy data, the PCIe switch 215 determines that the received data is data in the control section.

(S140) The PCIe switch 215 determines whether or not the data received from the CPU 212 is the dummy data ("Dmy data" in the drawings). For example, the PCIe switch 215 refers to the header #2 appended to the data received from the CPU 212 and determines that the received data is the dummy data when the header #2 includes tag information indicating the dummy data. Since the data transmitted from the CPU 212 in S138 is the dummy data, the PCIe switch 215 determines that the received data is the dummy data.

(S141) The PCIe switch 215 stores the dummy data received from the CPU 212 in the TBL buffer 215B ("C-Buffer" in the drawings).

(S142) The PCIe switch 215 returns to the CPU 212 an acknowledgement ("ACK" in the drawings) indicating that reception of the dummy data is completed.

(S143) The PCIe switch 215 transmits the dummy data ("Dmy1 data" in the drawings) stored in the TBL buffer 215B to the PCIe switch 225.

(S144) The PCIe switch 225 determines whether or not the data received from the PCIe switch 215 is data in the control section ("Ctrl section" in the drawings). For example, the PCIe switch 225 refers to the header #1 appended to the data received from the PCIe switch 215 and determines that the received data is data in the control section when the header #1 includes tag information indicating the control section. Since the data transmitted from the PCIe switch 215 in S143 is the dummy data, the PCIe switch 225 determines that the received data is data in the control section.

(S145) The PCIe switch 225 determines whether or not the data received from the PCIe switch 215 is the dummy data ("Dmy data" in the drawings). For example, the PCIe switch 225 refers to the header #2 appended to the data received from the PCIe switch 215 and determines that the received data is the dummy data when the header #2 includes tag information indicating the dummy data. Since the data transmitted from the PCIe switch 215 in S143 is the dummy data, the PCIe switch 225 determines that the received data is the dummy data.

(S146) The PCIe switch 225 stores the dummy data received from the PCIe switch 215 in the TBL buffer 225B ("C-Buffer" in the drawings).

(S147) The PCIe switch 225 returns to the PCIe switch 215 an acknowledgement ("ACK" in the drawings) indicating that reception of the dummy data is completed.

(S148) The PCIe switch 225 transmits the dummy data ("Dmy1 data" in the drawings) stored in the TBL buffer 225B to the CPU 222.

(S149) The CPU 222 refers to the headers #1 and #2 of the data received from the PCIe switch 225 and determines whether or not the received data is the dummy data. Since the data transmitted from the PCIe switch 225 in S148 is the dummy data, the CPU 222 determines that the received data is the dummy data.

(S150) The CPU 222 discards ("Delete" in the drawings) the dummy data.

(S151) The CPU 222 returns to the PCIe switch 225 an acknowledgement ("ACK" in the drawings) indicating that reception of the dummy data is completed.

(S152) Upon receiving the ACK from the CPU 222, the PCIe switch 225 empties the TBL buffer 225B ("C-Buffer clear" in the drawings).

(S153) Upon receiving the ACK transmitted from the PCIe switch 225 in S147, the PCIe switch 215 empties the TBL buffer 215B ("C-Buffer clear" in the drawings).

(S154) The PCIe switch 215 receives dummy data ("Dmy2 data" in the drawings) from the CPU 212.

(S155) The PCIe switch 215 determines whether or not the data received from the CPU 212 is data in the control section ("Ctrl section" in the drawings). Since the data transmitted from the CPU 212 in S154 is the dummy data, the PCIe switch 215 determines that the received data is data in the control section.

(S156) The PCIe switch 215 determines whether or not the data received from the CPU 212 is the dummy data ("Dmy data" in the drawings). Since the data transmitted from the CPU 212 in S154 is the dummy data, the PCIe switch 215 determines that the received data is the dummy data.

(S157) The PCIe switch 215 stores the dummy data received from the CPU 212 in the TBL buffer 215B ("C-Buffer" in the drawings).

(S158) The PCIe switch 215 returns to the CPU 212 an acknowledgement ("ACK" in the drawings) indicating that reception of the dummy data is completed.

(S159) The CPU 222 transmits to the server 100 a completion response ("Response" in the drawings) indicating that writing of the user data is completed, in response to the ACK (in S158) for the last transmitted dummy data ("Dmy2 data" in the drawings).

The control data is stored in the buffer 222A of the CPU 222 in S134. In response to this, the ACK is returned to the PCIe switch 225 in S135, and the TBL buffer 225B of the PCIe switch 225 is emptied in S136. Thereafter, the first dummy data is received by the PCIe switch 225 in S143, the dummy data is stored in the empty TBL buffer 225B in S146, and the ACK is returned to the PCIe switch 215 in S147.

In S153, the TBL buffer 215B is emptied in response to the ACK in S147. Thereafter, the second dummy data is received by the PCIe switch 215 in S154, the dummy data is stored in the empty TBL buffer 215B in S157, and the ACK is returned to the CPU 212 in S158. Therefore, when the CPU 212 receives the ACK returned in S158, it is guaranteed that control data has been stored in buffer 222A of the CPU 222. More specifically, the completion response in S159 is highly reliable assuming the guarantee of arrival of the user data and the control data in inter-CM communications.

(S160) The PCIe switch 215 transmits the dummy data ("Dmy2 data" in the drawings) stored in the TBL buffer 215B to the PCIe switch 225.

(S161) The PCIe switch 225 determines whether or not the data received from the PCIe switch 215 is data in the control section ("Ctrl section" in the drawings). Since the data transmitted from the PCIe switch 215 in S160 is the dummy data, the PCIe switch 225 determines that the received data is data in the control section.

(S162) The PCIe switch 225 determines whether or not the data received from the PCIe switch 215 is the dummy data ("Dmy data" in the drawings). Since the data transmitted from the PCIe switch 215 in S160 is the dummy data, the PCIe switch 225 determines that the received data is the dummy data.

(S163) The PCIe switch 225 stores the dummy data received from the PCIe switch 215 in the TBL buffer 225B ("C-Buffer" in the drawings).

(S164) The PCIe switch 225 returns to the PCIe switch 215 an acknowledgement ("ACK" in the drawings) indicating that reception of the dummy data is completed. Upon receiving this ACK, the PCIe switch 215 may empty the TBL buffer 215B in preparation for next inter-CM communications.

(S165) The PCIe switch 225 transmits the dummy data ("Dmy2 data" in the drawings) stored in the TBL buffer 225B to the CPU 222.

(S166) The CPU 222 refers to the headers #1 and #2 of the data received from the PCIe switch 225 and determines whether the received data is the dummy data. Since the data transmitted from the PCIe switch 225 in S165 is the dummy data, the CPU 222 determines that the received data is the dummy data.

(S167) The CPU 222 discards ("Delete" in the drawings) the dummy data.

(S168) The CPU 222 returns to the PCIe switch 225 an acknowledgement ("ACK" in the drawings) indicating that reception of the dummy data is completed. Upon receiving this ACK, the PCIe switch 225 may empty the TBL buffer 225B in preparation for next inter-CM communications.

When the processing of S168 is completed, a series of processing illustrated in FIGS. 7 to 10 is completed.

So far the sequence of the write processing in the storage system according to the second embodiment is described. As described above, the guarantee of arrival of user data and control data may be achieved by transmitting the same number of pieces of dummy data as the number of relay devices which lie between the CPUs 212 and 222 and making the size of the TBL buffers 215B and 225B to be equal to or smaller than the data length of the control data. Then, highly reliable processing involving the guarantee of arrival in inter-CM communications may be achieved by waiting for an acknowledgement of the last transmitted dummy data and returning a completion response of the write processing to the server 100.

So far the description has been given assuming the configuration in which buffer areas to store control data and dummy data, respectively, are separately provided in the PCIe switches 215 and 225. However, the guarantee of arrival may be similarly achieved through the use of one variable-sized buffer area. Here, a variation that uses a variable-sized buffer area (hereinafter referred to as a variable capacity buffer) is described.

Figure 11:
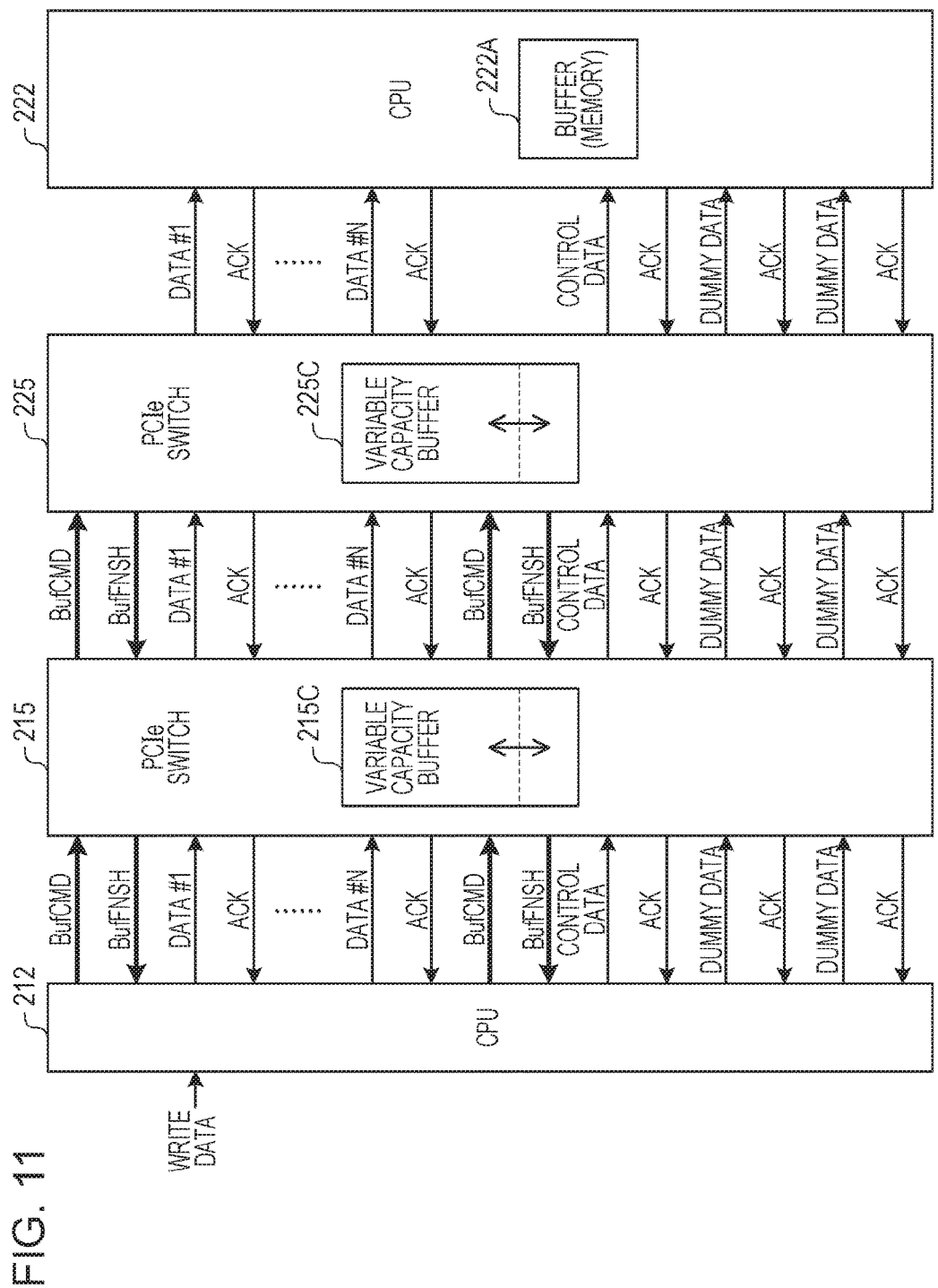
FIG. 11 is a diagram illustrating an example of inter-CM communications according to a variation example of the second embodiment.

In this variation, as illustrated in FIG. 11, variable capacity buffers 215C and 225C are used. FIG. 11 is a diagram illustrating an example of inter-CM communications according to a variation example of the second embodiment. The variable capacity buffers 215C and 225C are used to store any of data #1, . . . , data #N obtained by dividing the write data, the control data, and the dummy data. The size of each of the variable capacity buffers 215C and 225C is controlled by a command (BufCMD) for setting the size to a specified size.

As illustrated in FIG. 11, before transmitting the data #1, . . . , the data #N, the CPU 212 transmits a BufCMD for setting the size of the variable capacity buffer 215C to an appropriate size (12 Kbytes, for example) depending on the data length (128 Bytes, for example) of these data pieces. Upon receiving this BufCMD, the PCIe switch 215 changes the size of the variable capacity buffer 215C to the size specified by the BufCMD. Then, the PCIe switch 215 returns to the CPU 212 a response (BufFNSH) indicating that changing of the size of the variable capacity buffer 215C is completed.

Upon receiving the BufFNSH, the CPU 212 sequentially transmits the data #1, . . . , the data #N to the PCIe switch 215. Upon receiving the data #1, . . . , the data #N, the PCIe switch 215 stores each data in the variable capacity buffer 215C and then returns an ACK to the CPU 212.

The PCIe switch 215 transfers the BufCMD to the PCIe switch 225 before transmitting the data #1, . . . , the data #N stored in the variable capacity buffer 215C to the PCIe switch 225. Upon receiving this BufCMD, the PCIe switch 225 changes the size of the variable capacity buffer 225C to the size specified by the BufCMD. Then, the PCIe switch 225 transmits to the PCIe switch 215 a response (BufFNSH) indicating that changing of the size of the variable capacity buffer 225C is completed.

Upon receiving the BufFNSH, the PCIe switch 215 sequentially transmits the data #1, . . . , the data #N to the PCIe switch 225. Upon receiving the data #1, . . . , the data #N, the PCIe switch 225 stores each data in the variable capacity buffer 225C and then returns an ACK to the PCIe switch 215. The PCIe switch 225 also transmits the data #1, . . . , the data #N stored in the variable capacity buffer 215C to the CPU 222. Upon receiving the data #1, . . . , the data

N, the CPU 222 stores each data in buffer 222A and then returns an ACK to the PCIe switch 225.

Before transmitting the control data, the CPU 212 transmits a BufCMD for setting the size of the variable capacity buffer 215C to be equal to or smaller than the data length (128 Bytes, for example) of the control data. Upon receiving this BufCMD, the PCIe switch 215 changes the size of the variable capacity buffer 215C to the size specified by the BufCMD. Then, the PCIe switch 215 returns to the CPU 212 a response (BufFNSH) indicating that changing of the size of the variable capacity buffer 215C is completed.

Upon receiving BufFNSH, the CPU 212 sequentially transmits the control data and the two pieces of dummy data to the PCIe switch 215.

Upon receiving the control data, the PCIe switch 215 stores the control data in the variable capacity buffer 215C and then returns an ACK to the CPU 212.

The PCIe switch 215 transfers the BufCMD to the PCIe switch 225 before transmitting the control data stored in the variable capacity buffer 215C to the PCIe switch 225. Upon receiving this BufCMD, the PCIe switch 225 changes the size of the variable capacity buffer 225C to the size specified by the BufCMD. Then, the PCIe switch 225 returns to the PCIe switch 215 a response (BufFNSH) indicating that changing of the size of the variable capacity buffer 225C is completed.

Upon receiving the BufFNSH, the PCIe switch 215 transmits the control data stored in the variable capacity buffer 215C to the PCIe switch 225. Upon receiving the control data, the PCIe switch 225 stores the control data in the variable capacity buffer 225C and then returns an ACK to the PCIe switch 215. The PCIe switch 225 also transmits the control data stored in the variable capacity buffer 215C to the CPU 222. Upon receiving the control data, the CPU 222 stores the control data in the buffer 222A and then returns an ACK to the PCIe switch 225.

Upon receiving the ACK from the PCIe switch 225, the PCIe switch 215 empties the variable capacity buffer 215C. Then, the PCIe switch 215 receives the dummy data from the CPU 212. The PCIe switch 215 stores the received dummy data in the variable capacity buffer 215C and then returns an ACK to the CPU 212.

Upon receiving the ACK from the CPU 222, the PCIe switch 225 empties the variable capacity buffer 225C. Then, the PCIe switch 225 receives the dummy data from the PCIe switch 215. The PCIe switch 225 stores the received dummy data in the variable capacity buffer 225C and then returns an ACK to the PCIe switch 215.

After receiving the ACK for all of the data #1, . . . , the data #N, the control data, and the two pieces of dummy data, the CPU 212 returns to the server 100 a response indicating completion of writing. The CPU 222 discards the received dummy data.

As described above, by setting the variable capacity buffers 215C and 225C to an appropriate size and sequentially transmitting the control data and the two pieces of dummy data, each data is transferred, in a manner of being pushed out from each buffer. Thus, arrival of data preceding the control data may be guaranteed. More specifically, the control data has arrived at the CPU 222 when the CPU 212 receives an ACK for the last dummy data, and thus the data before the control data is guaranteed to have arrived.

A sequence of write processing in the variation example of the storage system according to the second embodiment is further described hereinafter with reference to FIGS. 12 to 17.

Figure 12:
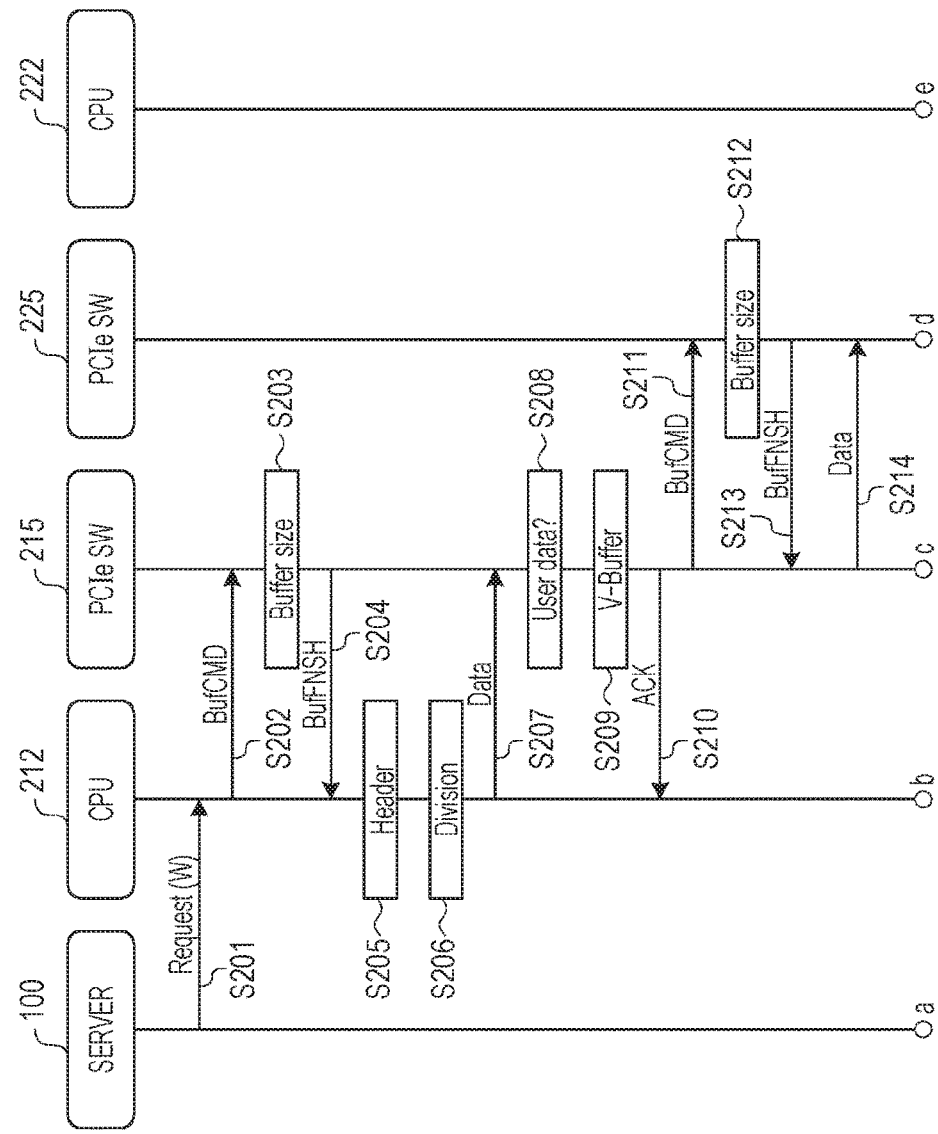
FIG. 12 is a first sequence diagram illustrating a flow of processing related to inter-CM communications and a response to a server according to the variation example of the second embodiment.
Figure 13:
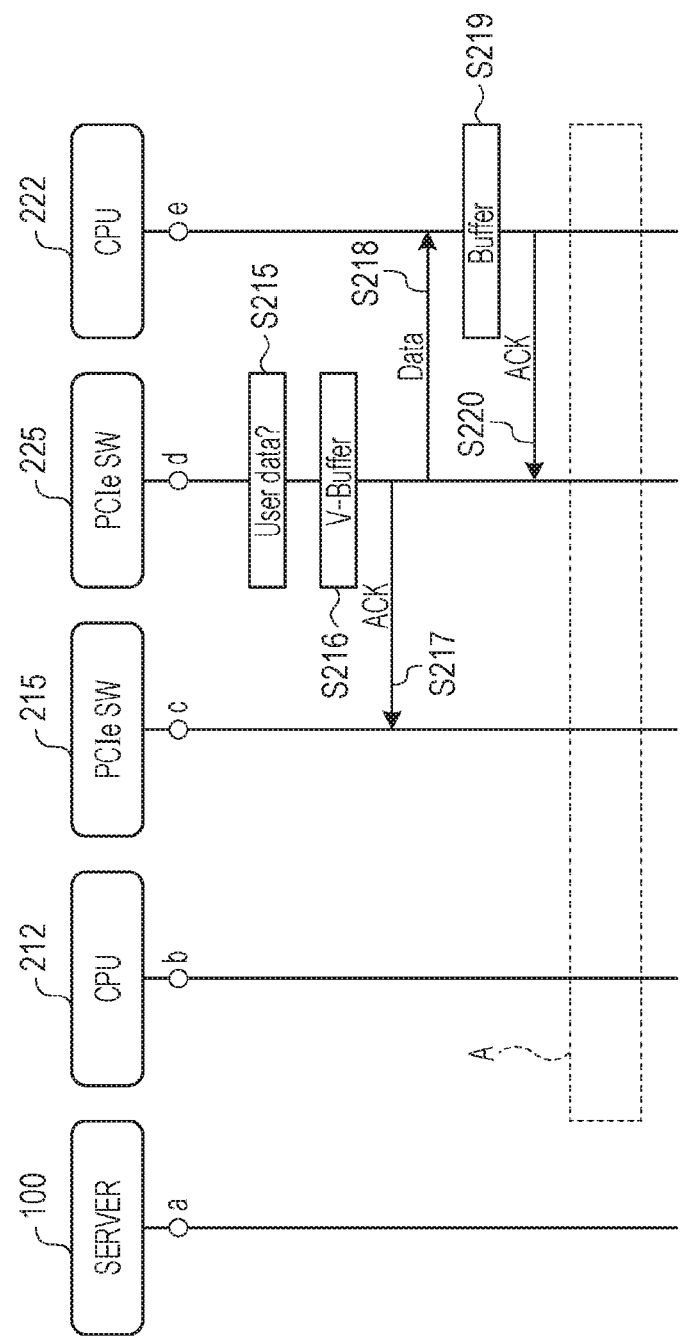
FIG. 13 is a second sequence diagram illustrating a flow of processing related to inter-CM communications and a response to a server according to the variation example of the second embodiment.

First, reference is made to FIGS. 12 and 13. FIG. 12 is a first sequence diagram illustrating a flow of processing related to inter-CM communications and a response to the server according to the variation example of the second embodiment. FIG. 13 is a second sequence diagram illustrating a flow of processing related to inter-CM communications and a response to the server according to the variation example of the second embodiment. Note that "a" to "e" assigned to the lines in FIG. 12 are connected to "a" to "e" assigned to the lines in FIG. 13.

(S201) The server 100 transmits a write request ("Request (W)" in the drawings) to the CM 201. The write request transmitted from the server 100 is received by the FC controller 214 and inputted to the CPU 212 by way of the PCIe switch 215. Upon receiving the write request, the CPU 212 starts processing of inter-CM communications to transmit the write target data (user data) to the CPU 222 of the CM 202.

(S202) The CPU 212 specifies a size (12 Kbytes, for example) suitable to store the divided data obtained by dividing the user data and transmits to the PCIe switch 215 a command ("BufCMD" in the drawings) for setting the buffer size to the specified size.

(S203) The PCIe switch 215 changes the size ("Buffer size" in the drawings) of the variable capacity buffer 215C to the size specified by the BufCMD received from the CPU 212.

(S204) The PCIe switch 215 returns to the CPU 212 a response ("BufFNSH" in the drawings) indicating that changing of the size of the variable capacity buffer 215C is completed.

(S205) The CPU 212 generates a header to be appended to the user data. For example, the CPU 212 generates a header #1 including tag information that distinguishes between the data section and the control section (see FIG. 5).

(S206) The CPU 212 divides the user data to generate divided data having a preset unit size (128 Bytes, for example). Then, the CPU 212 appends the header #1 generated in S205 to each piece of the divided data. In the following description, the divided data may be simply referred to as user data.

(S207) The CPU 212 sequentially transmits the divided data ("Data" in the drawings) generated in S206 to the PCIe switch 215.

(S208) The PCIe switch 215 determines whether or not the data received from the CPU 212 is user data. For example, the PCIe switch 215 refers to the header #1 appended to the received data and determines that the received data is the user data when the header #1 includes tag information indicating the data section. Since the data transmitted from the CPU 212 in S207 is the divided data, the PCIe switch 215 determines that the received data is the user data.

(S209) The PCIe switch 215 stores the divided data received from the CPU 212 in the variable capacity buffer 215C ("V-Buffer" in the drawings).

(S210) The PCIe switch 215 returns to the CPU 212 an acknowledgement ("ACK" in the drawings) indicating that reception of the divided data is completed. In response to this ACK, the CPU 212 transmits next divided data to the PCIe switch 215. Then, the similar processing as in the range of the dotted rectangular area A in FIG. 7 is executed on the next divided data. Note that for convenience of description, while the range of the dotted rectangular area A is illustrated in FIG. 13, the relevant processing is sequentially executed on divided data after the ACK in S210.

(S211) The PCIe switch 215 transfers the BufCMD to the PCIe switch 225.

(S212) The PCIe switch 225 changes the size ("Buffer size" in the drawings) of the variable capacity buffer 225C to the size specified by the BufCMD received from the PCIe switch 215.

(S213) The PCIe switch 225 returns to the PCIe switch 215 a response ("BufFNSH" in the drawings) indicating that changing of the size of the variable capacity buffer 225C is completed.

(S214) The PCIe switch 215 transmits the divided data stored in the variable capacity buffer 215C to the PCIe switch 225.

(S215) The PCIe switch 225 determines whether or not the data received from the PCIe switch 215 is user data. For example, the PCIe switch 225 refers to the header #1 appended to the received data and determines that the received data is the user data when the header #1 includes tag information indicating the data section. Since the data transmitted from the PCIe switch 215 in S214 is the divided data, the PCIe switch 225 determines that the received data is the user data.

(S216) The PCIe switch 225 stores the divided data received from the PCIe switch 215 in the variable capacity buffer 225C ("V-Buffer" in the drawings).

(S217) The PCIe switch 225 returns to the PCIe switch 215 an acknowledgement ("ACK" in the drawings) indicating that reception of the divided data is completed. In response to this ACK, the PCIe switch 215 transmits next divided data stored in the variable capacity buffer 215C to the PCIe switch 225.

(S218) The PCIe switch 225 transmits the divided data stored in the variable capacity buffer 225C to the CPU 222.

(S219) The CPU 222 stores the divided data received from the PCIe switch 225 in buffer 222A.

(S220) The CPU 222 returns to the PCIe switch 225 an acknowledgement ("ACK" in the drawings) indicating that reception of the divided data is completed. In response to this ACK, the PCIe switch 225 transmits next divided data stored in the variable capacity buffer 225C to the CPU 222. Note that processing in the range of the dotted rectangular area A is executed on all pieces of the divided data.

After transmitting all pieces of the divided data to the PCIe switch 215, the CPU 212 starts to transmit the control data and the dummy data.

Figure 14:
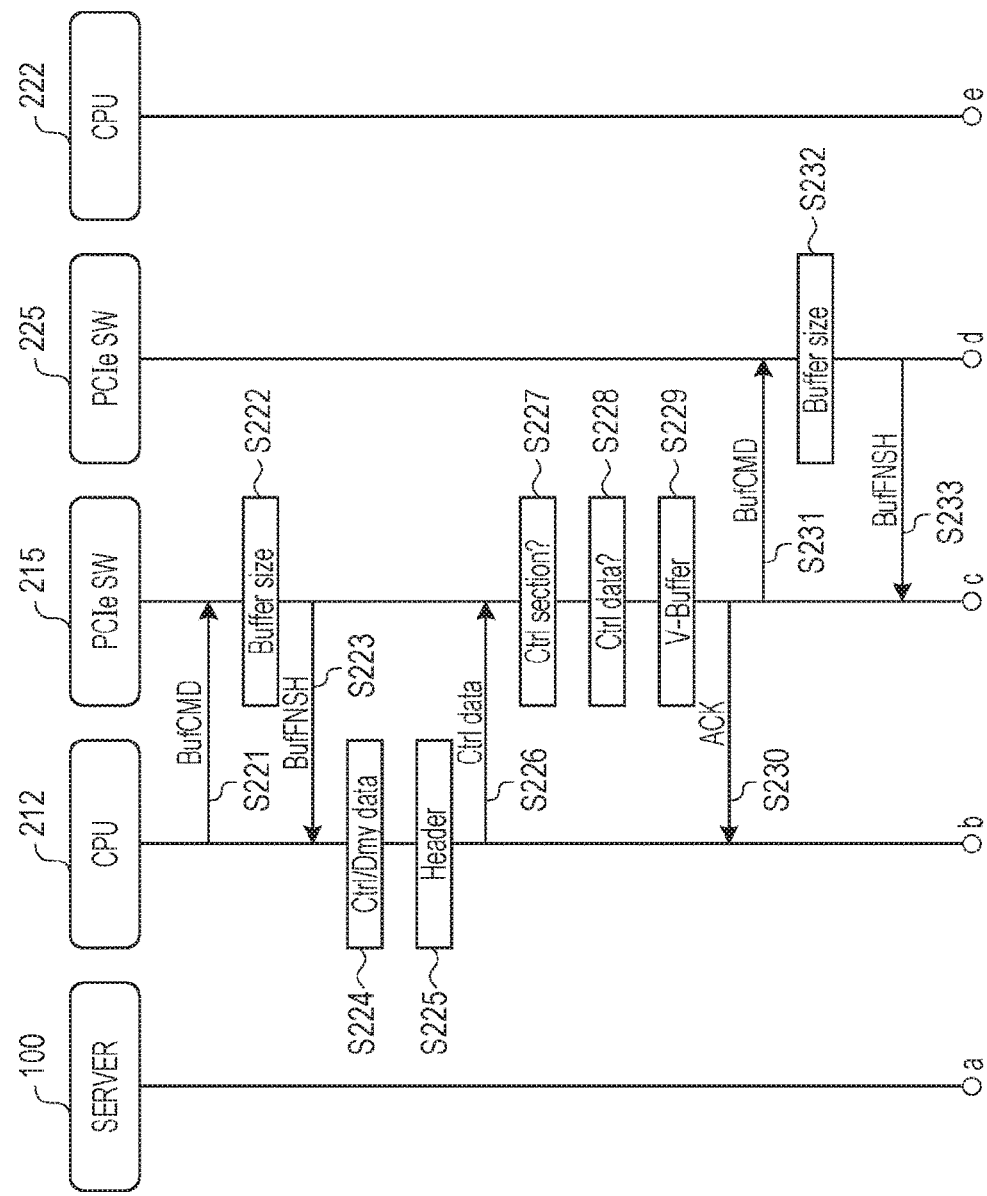
FIG. 14 is a third sequence diagram illustrating a flow of processing related to inter-CM communications and a response to a server according to the variation example of the second embodiment.
Figure 15:
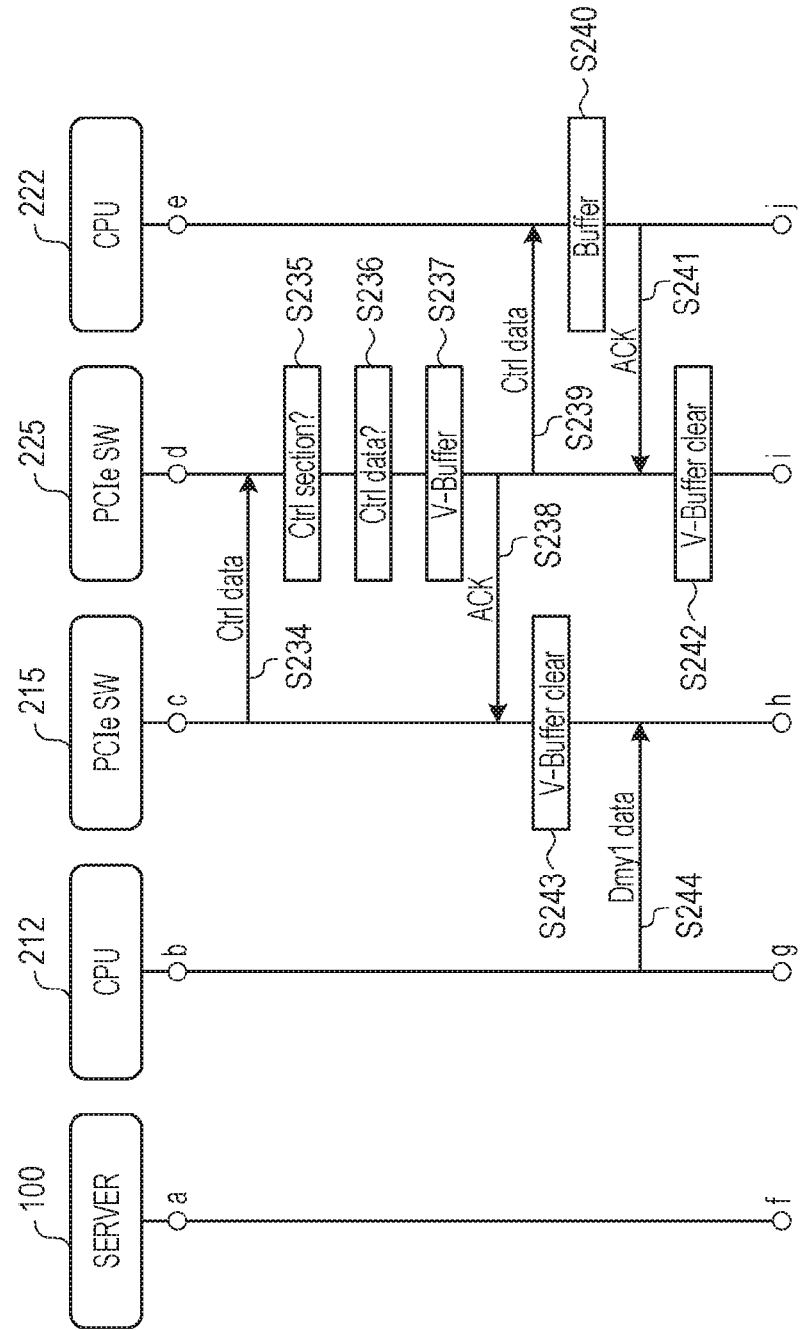
FIG. 15 is a fourth sequence diagram illustrating a flow of processing related to inter-CM communications and a response to a server according to the variation example of the second embodiment.
Figure 16:
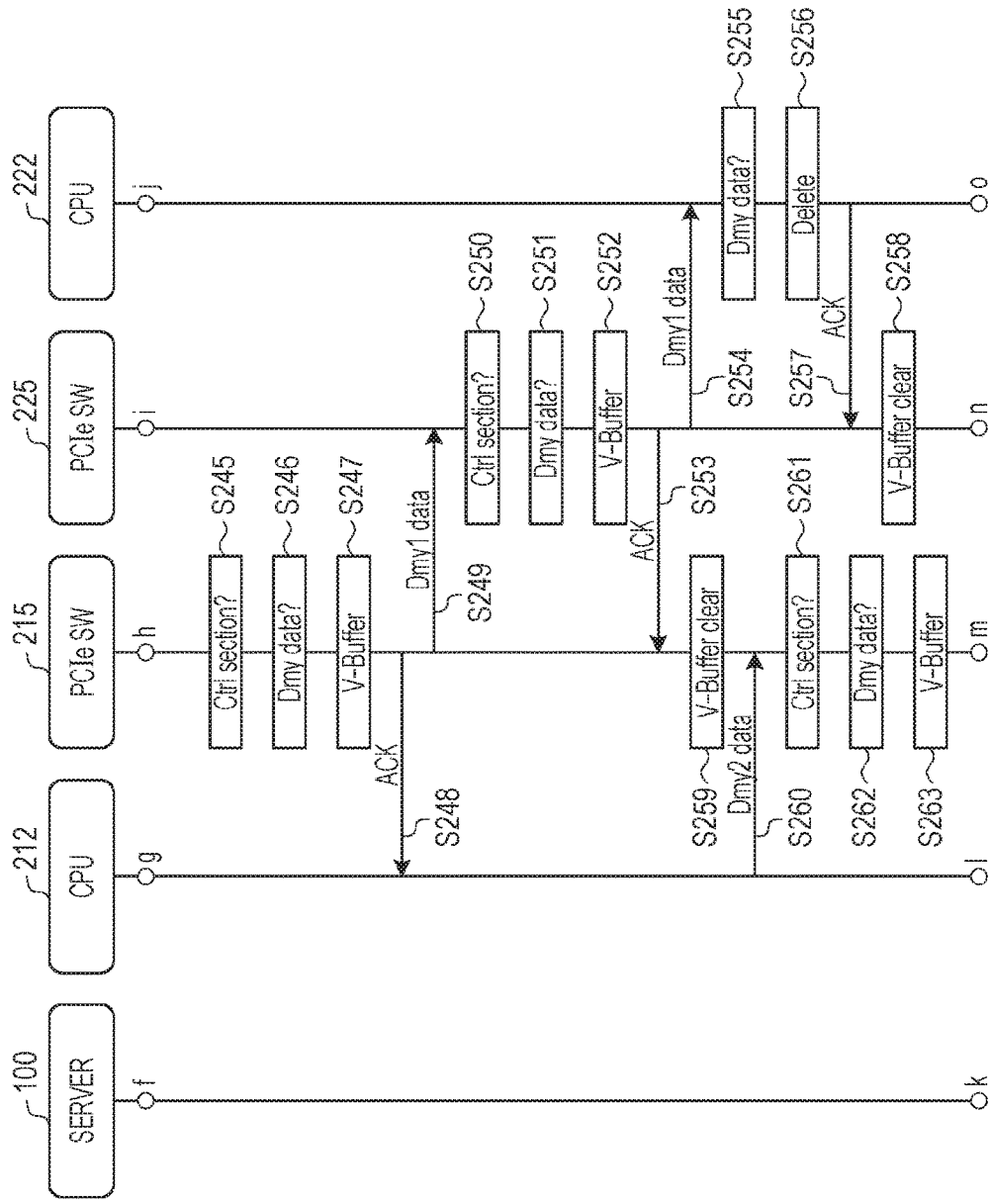
FIG. 16 is a fifth sequence diagram illustrating a flow of processing related to inter-CM communications and a response to a server according to the variation example of the second embodiment.

In the following, reference is sequentially made to FIGS. 14 to 17. FIG. 14 is a third sequence diagram illustrating a flow of processing related to inter-CM communications and a response to the server according to the variation example of the second embodiment. FIG. 15 is a fourth sequence diagram illustrating a flow of processing related to inter-CM communications and a response to the server according to the variation example of the second embodiment. FIG. 16 is a fifth sequence diagram illustrating a flow of processing related to inter-CM communications and a response to the server according to the variation example of the second embodiment. FIG. 17 is a sixth sequence diagram illustrating a flow of processing related to inter-CM communications and a response to the server according to the variation example of the second embodiment.

Note that "a" to "e" assigned to the lines in FIG. 14 are connected to "a" to "e" assigned to the lines in FIG. 15, "f" to "j" assigned to the lines in FIG. 15 are connected to "f" to "j" assigned to the lines in FIG. 16, and "k" to "o" assigned to the lines in FIG. 16 are connected to "k" to "o" assigned to the lines in FIG. 17.

(S221) The CPU 212 transmits to the PCIe switch 215 a BufCMD that specifies a size (128 Bytes, for example) equal to or smaller than data length of the control data.

(S222) The PCIe switch 215 changes the size ("Buffer size" in the drawings) of the variable capacity buffer 215C to the size specified by the BufCMD received from the CPU 212.

(S223) The PCIe switch 215 returns to the CPU 212 a response ("BufFNSH" in the drawings) indicating that changing of the size of the variable capacity buffer 215C is completed.

(S224) The CPU 212 generates control data ("Ctrl data" in the drawings) including information indicating a write destination of the user data and the same number of pieces of dummy data ("Dmy data" in the drawings) as the number of relay devices which lie between the CPUs 212 and 222. In this example, two pieces of dummy data ("Dmy1 data" and "Dmy2 data" in the drawings) are generated.

(S225) The CPU 212 generates a header to be appended to the control data and the dummy data. For example, the CPU 212 generates a header #1 including tag information that distinguishes between the data section and the control section (see FIG. 5). The CPU 212 also generates a header #2 including tag information that distinguishes between the control data and the dummy data (see FIGS. 4 and 6). Then, the CPU 212 appends the headers #1 and #2 to the control data and the dummy data.

(S226) The CPU 212 transmits the control data to the PCIe switch 215.

(S227) The PCIe switch 215 determines whether or not the data received from the CPU 212 is data in the control section ("Ctrl section" in the drawings). For example, the PCIe switch 215 refers to the header #1 appended to the data received from the CPU 212 and determines that the received data is data in the control section when the header #1 includes tag information indicating the control section. Since the data transmitted from the CPU 212 in S226 is the control data, the PCIe switch 215 determines that the received data is data in the control section.

(S228) The PCIe switch 215 determines whether or not the data received from the CPU 212 is the control data ("Ctrl data" in the drawings). For example, the PCIe switch 215 refers to the header #2 appended to the data received from the CPU 212 and determines that the received data is the control data when the header #2 includes tag information indicating the control data. Since the data transmitted from the CPU 212 in S226 is the control data, the PCIe switch 215 determines that the received data is the control data.

(S229) The PCIe switch 215 stores the control data received from the CPU 212 in the variable capacity buffer 215C ("V-Buffer" in the drawings).

(S230) The PCIe switch 215 returns to the CPU 212 an acknowledgement ("ACK" in the drawings) indicating that reception of the control data is completed.

(S231) The PCIe switch 215 transfers the BufCMD to the PCIe switch 225.

(S232) The PCIe switch 225 changes the size (Buffer size) of the variable capacity buffer 225C to the size specified by the BufCMD received from the PCIe switch 215.

(S233) The PCIe switch 225 returns to the PCIe switch 215 a response ("BufFNSH" in the drawings) indicating that changing of the size of the variable capacity buffer 225C is completed.

(S234) The PCIe switch 215 transmits the control data stored in the variable capacity buffer 215C to the PCIe switch 225.

(S235) The PCIe switch 225 determines whether or not the data received from the PCIe switch 215 is data in the control section ("Ctrl section" in the drawings). For example, the PCIe switch 225 refers to the header #1 appended to the data received from the PCIe switch 215 and determines that the received data is data in the control section when the header #1 includes tag information indicating the control section. Since the data transmitted from the PCIe switch 215 in S234 is the control data, the PCIe switch 225 determines that the received data is data in the control section.

(S236) The PCIe switch 225 determines whether or not the data received from the PCIe switch 215 is the control data ("Ctrl data" in the drawings). For example, the PCIe switch 225 refers to the header #2 appended to the data received from the PCIe switch 215 and determines that the received data is the control data when the header #2 includes tag information indicating the control data. Since the data transmitted from the PCIe switch 215 in S234 is the control data, the PCIe switch 225 determines that the received data is the control data.

(S237) The PCIe switch 225 stores the control data received from the PCIe switch 215 in the variable capacity buffer 225C ("V-Buffer" in the drawings).

(S238) The PCIe switch 225 returns to the PCIe switch 215 an acknowledgement ("ACK" in the drawings) indicating that reception of the control data is completed.

(S239) The PCIe switch 225 transmits the control data stored in the variable capacity buffer 225C to the CPU 222.

(S240) The CPU 222 refers to the headers #1 and #2 of the data received from the PCIe switch 225, confirms that data is the control data, and stores that control data in buffer 222A.

(S241) The CPU 222 returns to the PCIe switch 225 an acknowledgement ("ACK" in the drawings) indicating that reception of the control data is completed.

(S242) Upon receiving the ACK from the CPU 222, the PCIe switch 225 empties the variable capacity buffer 225C ("V-Buffer clear" in the drawings).

(S243) Upon receiving the ACK transmitted from the PCIe switch 225 in S238, the PCIe switch 215 empties the variable capacity buffer 215C ("V-Buffer clear" in the drawings).

(S244) The PCIe switch 215 receives dummy data ("Dmy1 data" in the drawings) from the CPU 212.

(S245) The PCIe switch 215 determines whether or not the data received from the CPU 212 is data in the control section ("Ctrl section" in the drawings). For example, the PCIe switch 215 refers to the header #1 appended to the data received from the CPU 212 and determines that the received data is data in the control section when the header #1 includes tag information indicating the control section. Since the data transmitted from the CPU 212 in S244 is the dummy data, the PCIe switch 215 determines that the received data is data in the control section.

(S246) The PCIe switch 215 determines whether or not the data received from the CPU 212 is the dummy data ("Dmy data" in the drawings). For example, the PCIe switch 215 refers to the header #2 appended to the data received from the CPU 212 and determines that the received data is the dummy data when the header #2 includes tag information indicating the dummy data. Since the data transmitted from the CPU 212 in S244 is the dummy data, the PCIe switch 215 determines that the received data is the dummy data.

(S247) The PCIe switch 215 stores the dummy data received from the CPU 212 in the variable capacity buffer 215C ("V-Buffer" in the drawings).

(S248) The PCIe switch 215 returns to the CPU 212 an acknowledgement ("ACK" in the drawings) indicating that reception of the dummy data is completed.

(S249) The PCIe switch 215 transmits the dummy data ("Dmy1 data" in the drawings) stored in the variable capacity buffer 215C to the PCIe switch 225.

(S250) The PCIe switch 225 determines whether or not the data received from the PCIe switch 215 is data in the control section ("Ctrl section" in the drawings). For example, the PCIe switch 225 refers to the header #1 appended to the data received from the PCIe switch 215 and determines that the received data is data in the control section when the header #1 includes tag information indicating the control section. Since the data transmitted from the PCIe switch 215 in S249 is the dummy data, the PCIe switch 225 determines that the received data is data in the control section.

(S251) The PCIe switch 225 determines whether or not the data received from the PCIe switch 215 is the dummy data ("Dmy data" in the drawings). For example, the PCIe switch 225 refers to the header #2 appended to the data received from the PCIe switch 215 and determines that the received data is the dummy data when the header #2 includes tag information indicating the dummy data. Since the data transmitted from the PCIe switch 215 in S249 is the dummy data, the PCIe switch 225 determines that the received data is the dummy data.

(S252) The PCIe switch 225 stores the dummy data received from the PCIe switch 215 in the variable capacity buffer 225C ("V-Buffer" in the drawings).

(S253) The PCIe switch 225 returns to the PCIe switch 215 an acknowledgement ("ACK" in the drawings) indicating that reception of the dummy data is completed.

(S254) The PCIe switch 225 transmits the dummy data ("Dmy1 data" in the drawings) stored in the variable capacity buffer 225C to the CPU 222.

(S255) The CPU 222 refers to the headers #1 and #2 of the data received from the PCIe switch 225 and determines whether or not the received data is the dummy data. Since the data transmitted from the PCIe switch 225 in S254 is the dummy data, the CPU 222 determines that the receive data is the dummy data.

(S256) The CPU 222 discards ("Delete" in the drawings) the dummy data.

(S257) The CPU 222 returns to the PCIe switch 225 an acknowledgement ("ACK" in the drawings) indicating that reception of the dummy data is completed.

(S258) Upon receiving the ACK from the CPU 222, the PCIe switch 225 empties the variable capacity buffer 225C ("V-Buffer clear" in the drawings).

(S259) Upon receiving the ACK transmitted from the PCIe switch 225 in S253, the PCIe switch 215 empties the variable capacity buffer 215C ("V-Buffer clear" in the drawings).

(S260) The PCIe switch 215 receives dummy data ("Dmy2 data" in the drawings) from the CPU 212.

(S261) The PCIe switch 215 determines whether or not the data received from the CPU 212 is data in the control section ("Ctrl section" in the drawings). Since the data transmitted from the CPU 212 in S260 is the dummy data, the PCIe switch 215 determines that the received data is data in the control section.

(S262) The PCIe switch 215 determines whether or not the data received from the CPU 212 is the dummy data ("Dmy data" in the drawings). Since the data transmitted from the CPU 212 in S260 is the dummy data, the PCIe switch 215 determines that the received data is the dummy data.

(S263) The PCIe switch 215 stores the dummy data received from the CPU 212 in the variable capacity buffer 215C ("V-Buffer" in the drawings).

(S264) The PCIe switch 215 returns to the CPU 212 an acknowledgement ("ACK" in the drawings) indicating that reception of the dummy data is completed.

(S265) The CPU 212 transmits to the server 100 a completion response ("Response" in the drawings) indicating that writing of the user data is completed, in response to the ACK (in S264) for the last transmitted dummy data ("Dmy2 data" in the drawings).

The control data is stored in buffer 222A of the CPU 222 in S240. In response to this, the ACK is returned to the PCIe switch 225 in S241, and the variable capacity buffer 225C of the PCIe switch 225 is emptied in S242. Thereafter, the first dummy data is received by the PCIe switch 225 in S249, the dummy data is stored in the empty variable capacity buffer 225C in S252, and the ACK is returned to the PCIe switch 215 in S253.

In S259, the variable capacity buffer 215C is emptied in response to the ACK in S253. Thereafter, the second dummy data is received by the PCIe switch 215 in S260, the dummy data is stored in the empty variable capacity buffer 215C in S263, and the ACK is returned to the CPU 212 in S264. Therefore, when the CPU 212 receives the ACK returned in S264, it is guaranteed that the control data has been stored in buffer 222A of the CPU 222. More specifically, the completion response in S265 is highly reliable assuming the guarantee of arrival of the user data and the control data in the inter-CM communications.

(S266) The PCIe switch 215 transmits the dummy data ("Dmy2 data" in the drawings) stored in the variable capacity buffer 215C to the PCIe switch 225.

(S267) The PCIe switch 225 determines whether or not the data received from the PCIe switch 215 is data in the control section ("Ctrl section" in the drawings). Since the data transmitted from the PCIe switch 215 in S266 is the dummy data, the PCIe switch 225 determines that the received data is data in the control section.

(S268) The PCIe switch 225 determines whether or not the data received from the PCIe switch 215 is the dummy data ("Dmy data" in the drawings). Since the data transmitted from the PCIe switch 215 in S266 is the dummy data, the PCIe switch 225 determines that the received data is the dummy data.

(S269) The PCIe switch 225 stores the dummy data received from the PCIe switch 215 in the variable capacity buffer 225C ("V-Buffer" in the drawings).

(S270) The PCIe switch 225 returns to the PCIe switch 215 an acknowledgement ("ACK" in the drawings) indicating that reception of the dummy data is completed.

(S271) The PCIe switch 225 transmits the dummy data ("Dmy2 data" in the drawings) stored in the variable capacity buffer 225C to the CPU 222.

(S272) the CPU 222 refers to the headers #1 and #2 of the data received from the PCIe switch 225 and determines whether the received data is the dummy data. Since the data transmitted from the PCIe switch 225 in S271 is the dummy data, the CPU 222 determines that the received data is the dummy data.

(S273) The CPU 222 discards ("Delete" in the drawings) the dummy data.

(S274) The CPU 222 returns to the PCIe switch 225 an acknowledgement ("ACK" in the drawings) indicating that reception of the dummy data is completed. When the processing of S274 is completed, a series of processing illustrated in FIGS. 12 to 17 is completed.

So far, the sequence of the write processing in the storage system according to the variation example of the second embodiment is described. As described above, the guarantee of arrival of user data and control data may be achieved by transmitting the same number of pieces of dummy data as the number of relay devices which lie between the CPUs 212 and 222 and setting the size of the variable capacity buffers 215C and 225C to be equal to or smaller than the data length of the control data before transmitting the control data. Then, highly reliable processing involving the guarantee of arrival in inter-CM communications may be achieved by waiting for an acknowledgement of the last transmitted dummy data and returning a completion response of the write processing to the server 100.

The second embodiment is described above.

In the above description, inter-CM communications connected through the PCIe switches are assumed. However, the technology described above may also be applied to communications between processors connected in such a connection form as SAS or Infiniband. In addition, the technology described above may be similarly applied even when the number of relay devices is changed to any number of 1 or more. Such application examples also belong to the technical scope of the second embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage control device, comprising:
a first processor configured to transmit data;
a second processor configured to receive the data; and
transfer units configured to form a path through which the data is transferred from the first processor to the second processor,
wherein
the first processor is configured to
receive a write request for writing first data from a first device,
sequentially transmit the first data, additional data, and pieces of dummy data, a number of the pieces being same as a number of the transfer units, and
notify the first device of completion of the writing upon receiving an acknowledgement for a last transmitted piece of dummy data, and
each of the transfer units includes:
a storage unit provided with a first buffer area having a first size equal to or smaller than a data length of the additional data, and
a third processor configured to
receive the additional data from a preceding processor in the path,
store the received additional data in the first buffer area, transmit, upon storing the received additional data, an acknowledgement for the received additional data to the preceding processor, receive one piece of dummy data from the preceding processor, store the one piece of dummy data in the first buffer area, and transmit, upon storing the one piece of dummy data, an acknowledgement for the one piece of dummy data to the preceding processor.

2. The storage control device according to claim 1, wherein
the third processor is configured to
transmit the additional data stored in the first buffer area to a subsequent processor in the path,
empty the first buffer area upon receiving an acknowledgement for the additional data from the subsequent processor,
transmit the one piece of dummy data stored in the first buffer area to the subsequent processor, and
empty the first buffer area upon receiving an acknowledgement for the one piece of dummy data from the subsequent processor.

3. The storage control device according to claim 1, wherein
the first processor is configured to
transmit, before transmitting the first data, a first control instruction to control the first buffer area to have a second size capable of storing the first data, and
transmit, before transmitting the additional data, a second control instruction to control the first buffer area to have the first size.

4. The storage control device according to claim 1, wherein
the storage unit is further provided with a second buffer area for storing the first data, the second buffer area being different from the first buffer area.

5. The storage control device according to claim 1, wherein
the first processor is configured to
append, to each of the additional data and the pieces of dummy data, first header information for distinguishing between a control section and a data section, the control section including the additional data and the pieces of dummy data, the data section including the first data, and
the second processor is configured to
distinguish from the first data, based on the first header information, the additional data received subsequent to the first data, and
discard the pieces of dummy data received subsequent to the additional data.

6. The storage control device according to claim 5, wherein
the first processor is configured to
append, to each of the additional data and the pieces of dummy data, second header information for distinguishing between the additional data and the pieces of dummy data, and
the second processor is configured to
discard the pieces of dummy data distinguished from the additional data based on the first header information and the second header information.

* * * * *